United States Patent
Matsuyama et al.

(10) Patent No.: US 10,140,192 B2
(45) Date of Patent: Nov. 27, 2018

(54) APPARATUS AND METHOD TO COLLECT MEMORY DUMP INFORMATION OF A FAULTY NODE IN A PARALLEL COMPUTER SYSTEM

(71) Applicant: FUJITSU LIMITED, Kawasaki-shi, Kanagawa (JP)

(72) Inventors: Yoshihiro Matsuyama, Kawasaki (JP); Tsuyoshi Hashimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 158 days.

(21) Appl. No.: 15/433,405

(22) Filed: Feb. 15, 2017

(65) Prior Publication Data
US 2017/0242766 A1 Aug. 24, 2017

(30) Foreign Application Priority Data
Feb. 23, 2016 (JP) .................. 2016-032532

(51) Int. Cl.
G06F 11/00 (2006.01)
G06F 11/20 (2006.01)
G06F 11/16 (2006.01)

(52) U.S. Cl.
CPC ...... *G06F 11/2041* (2013.01); *G06F 11/1658* (2013.01); *G06F 11/2094* (2013.01); *G06F 11/2097* (2013.01); *G06F 2201/85* (2013.01)

(58) Field of Classification Search
CPC ................................................ G06F 11/2041
USPC ........... 714/10, 11, 12, 13, 14, 4.1, 4.11, 6.1
See application file for complete search history.

(56) References Cited

U.S. PATENT DOCUMENTS

| | | | | |
|---|---|---|---|---|
| 2010/0274845 | A1* | 10/2010 | Hikichi | H04N 21/2393 709/203 |
| 2011/0235522 | A1* | 9/2011 | Matoba | H04L 41/0893 370/241 |
| 2012/0072635 | A1* | 3/2012 | Yoshida | H04L 49/3027 710/306 |

FOREIGN PATENT DOCUMENTS

| | | |
|---|---|---|
| JP | 11-306051 | 11/1999 |
| JP | 2010-176345 | 8/2010 |

* cited by examiner

*Primary Examiner* — Dieu Minh T Le
(74) *Attorney, Agent, or Firm* — Staas & Halsey LLP

(57) ABSTRACT

An apparatus includes nodes each configured to relay data between the nodes. When a failure occurs in a first-node, a management-node determines, based on power consumption and/or memory usage of the nodes, a collection-node that transmits an instruction in first direction approaching the first-node and a second direction approaching a storage-node, respectively. A second-node that is neither an adjacent-node adjacent to the first-node nor the storage-node, upon receiving data including the instruction, transmit data obtained by adding an evaluation value for the second-node to the received data, in the first or second direction. Each of the adjacent-node and the storage-node, upon receiving data including the instruction, transmit data including an evaluation value for another node included in the received data and an evaluation value for the each node, to the collection-node which determines transmission routes between the collection-node and the first-node, and between the collection-node and the storage-node.

10 Claims, 16 Drawing Sheets

FIG. 10

| An COORDINATE | DESTINATION NODE TYPE | DESTINATION NODE COORDINATE | EVALUATION VALUE | ROUTE INFORMATION 1001 | | |
|---|---|---|---|---|---|---|
| | | | | NODE 1 COORDINATE | NODE 2 COORDINATE | NODE 3 COORDINATE |
| (Xn,Yn,Zn) | DOWN NODE | (Xp,Yp,Zp) | 0 | (Xn,Yn,Zn) | | ... |

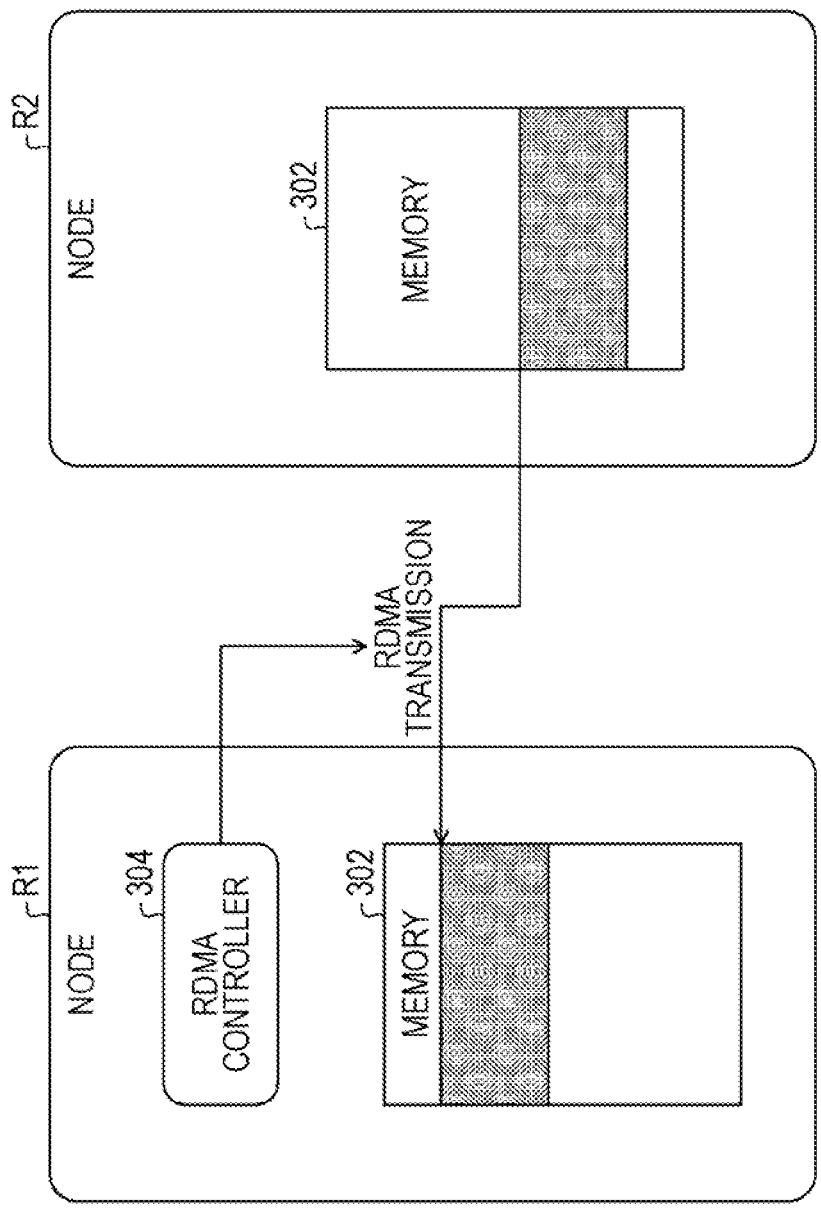

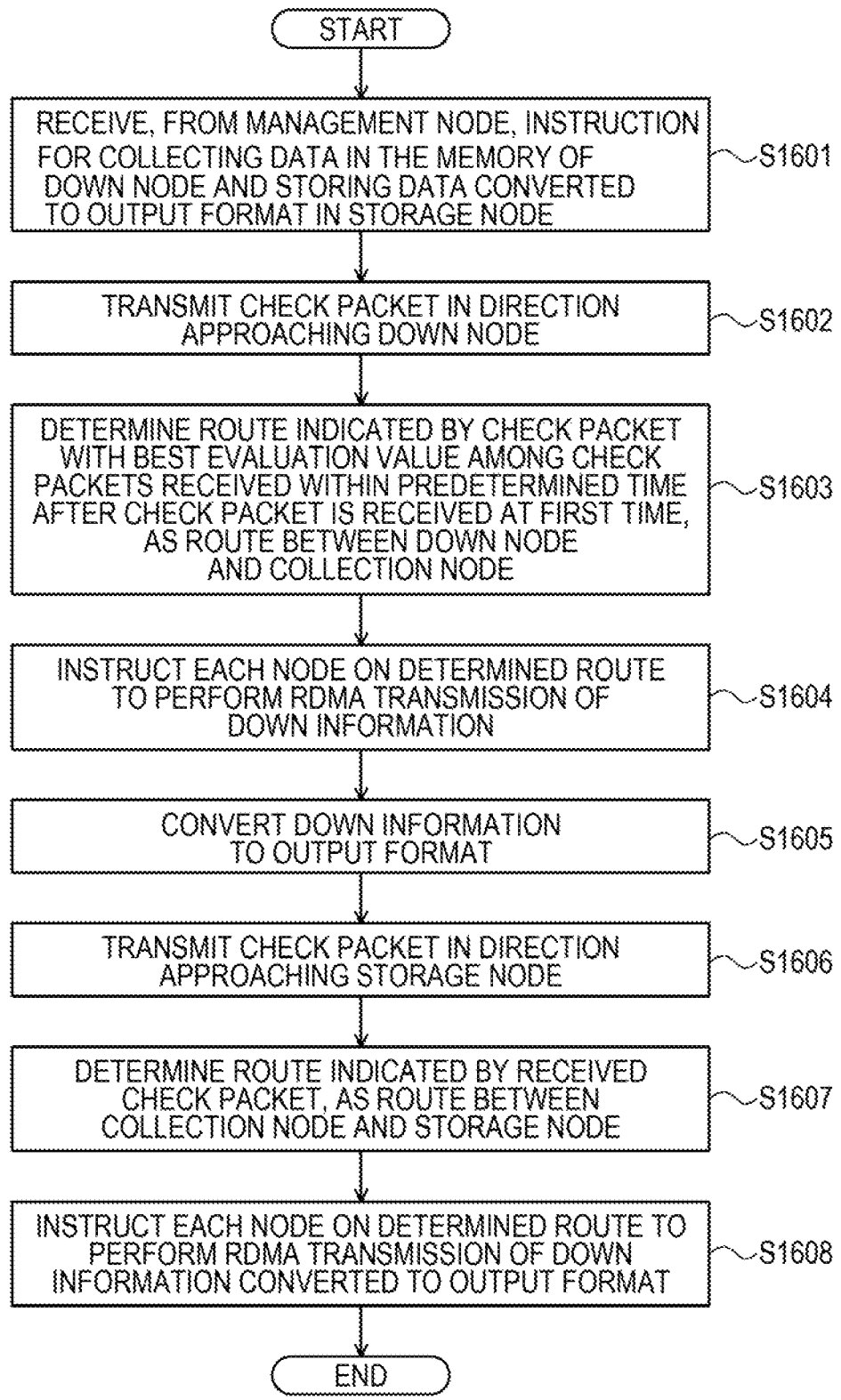

APPARATUS AND METHOD TO COLLECT MEMORY DUMP INFORMATION OF A FAULTY NODE IN A PARALLEL COMPUTER SYSTEM

CROSS-REFERENCE TO RELATED APPLICATION

This application is based upon and claims the benefit of priority of the prior Japanese Patent Application No. 2016-032532, filed on Feb. 23, 2016, the entire contents of which are incorporated herein by reference.

FIELD

The embodiments discussed herein are related to apparatus and method to collect memory dump information of a faulty node in a parallel computer system.

BACKGROUND

In the related art, there is a technique in which a plurality of nodes, each of which includes a processor and a memory and relays data between nodes, execute a job as processing such as scientific computation. Further, there is a technique for collecting a memory dump at the time of occurrence of a failure in the processor. As an associated technique in the related art, for example, there is a technique in which, when a failure occurs in a processor, the processor with the failure specifies an associated processor which does not have a direct cause of the failure but may have an indirect cause of the failure, and request a system management processor to collect a memory dump. In addition, there is a technique in which, in a multi-node system including a plurality of nodes that are able to communicate with each other, when a failure occurs in any node, a node in which a failure does not occur acquires information stored in the memory of the node in which the failure has occurred.

Japanese Laid-open Patent Publication Nos. 11-306051 and 2010-176345 are examples of related art.

SUMMARY

According to an aspect of the invention, an apparatus includes a plurality of nodes each configured to relay data between the plurality of nodes. When a failure occurs in a first node of the plurality of nodes, a management node, which is included in the plurality of nodes and manages the plurality of nodes, determines a collection node that is included in the plurality of nodes and collects first information stored in the memory of the first node, based on power consumption and/or memory usage of each of the plurality of nodes, and transmits, to the determined collection node, data including a first instruction for causing a storage node in the plurality of nodes to store second information generated from the first information into a memory of the storage node. The collection node, upon receiving the first instruction, transmits data including a second instruction that instructs transmission of an evaluation value for communication performance of each node, in a first direction approaching the first node and in a second direction approaching the storage node, respectively. Upon receiving data that is transmitted in the first direction and includes the second instruction, a second node, which is included in the plurality of nodes and is neither an adjacent node adjacent to the first node nor the storage node, transmits data obtained by adding an evaluation value for communication performance of the second node to the received data, in the first direction. Upon receiving data that is transmitted in the second direction and includes the second instruction, the second node transmits data obtained by adding an evaluation value for communication performance of the second node to the received data, in the second direction. Upon receiving data that is transmitted in the first direction or in the second direction and includes the second instruction, each of the adjacent node and the storage node transmits data including an evaluation value for communication performance of another node that is included in the received data and an evaluation value for communication performance of the each of the adjacent node and the storage node, to the collection node. Upon receiving data including an evaluation for communication performance of the adjacent node, the collection node determines a transmission route between the collection node and the first node, based on the received data, and, upon receiving data including an evaluation value for communication performance of the storage node, the collection node determines a transmission route between the collection node and the storage node, based on the received data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a diagram illustrating an example of a format of a check packet, according to an embodiment;

FIG. 15 is a diagram illustrating an example of an operation of a collection node in which a check packet is received, according to an embodiment; and FIG. 16 is a diagram illustrating an example of an operational flowchart for information collection processing, according to an embodiment.

DESCRIPTION OF EMBODIMENTS

According to the related art, in the processing of collecting the information stored in the memory of a failure node from the plurality of nodes, and storing information based on the collected information in a storage node, it is difficult to suppress the influence on the job that is being executed in each node along routes through which the information is transmitted. For example, in order to perform the processing by suppressing the influence on the job that is being executed in each node along routes through which the information is transmitted, the routes are determined such that a route from the failure node to the collection node and a route from the collection node to the storage node do not include a node with the large load imposed by the job that is being executed. However, when a specific node among the nodes periodically acquires a processing state of each node from the each node, and determines a route based on the acquired processing state of each node, the load which is applied to the specific node increases, and the influence on the job that is being executed in the specific node increases.

In the processing of collecting the information stored in the memory of a failure node and storing information based on the collected information in a storage node, it is preferable to suppress the influence on the job that is being executed in each node along route through which the information is transmitted.

Hereinafter, embodiments of a parallel processing apparatus, a node information collection method, and a node information collection program discussed herein are described in detail with reference to the drawings.

Figure 1:
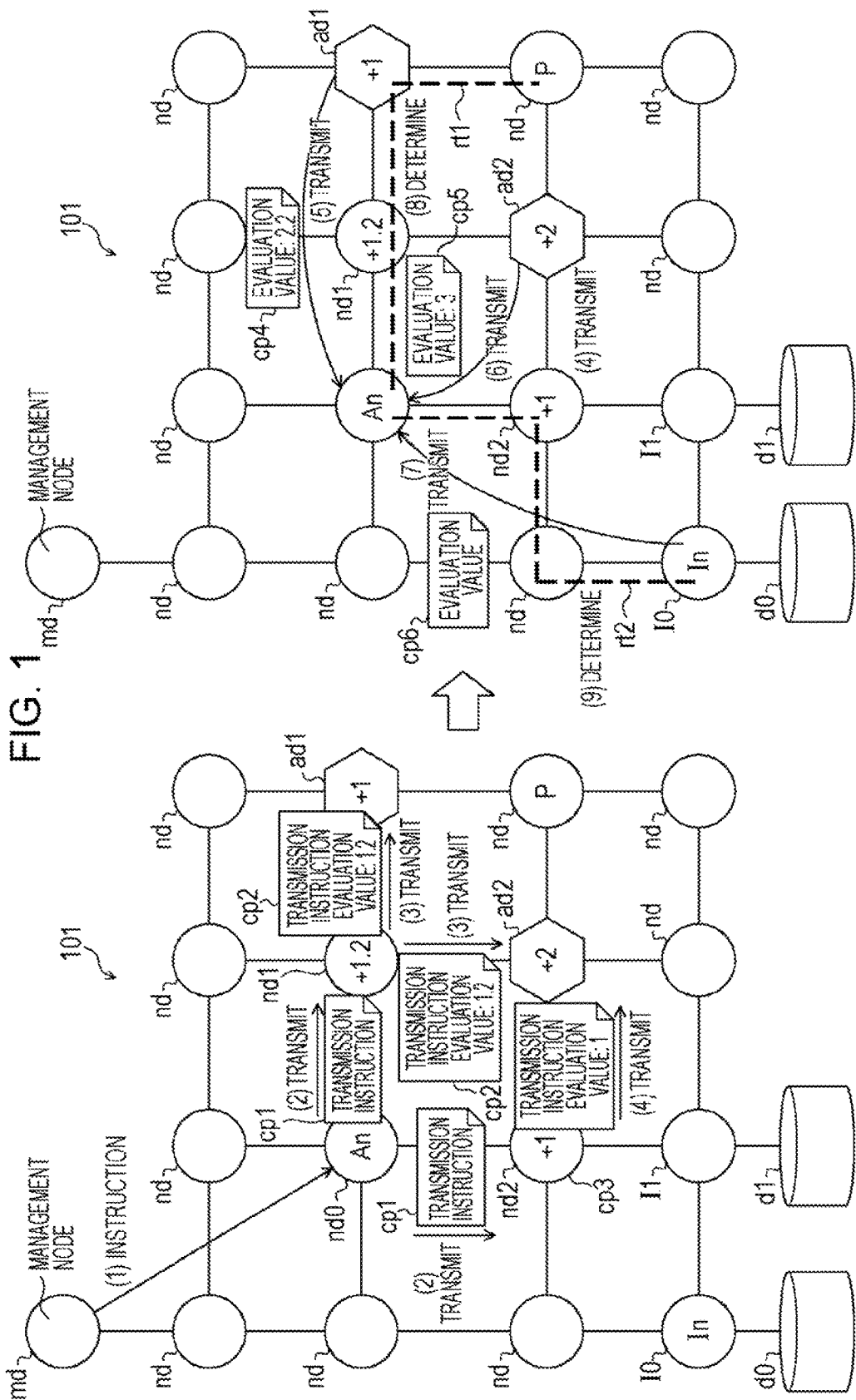
FIG. 1 is a diagram illustrating an example of an operation of a parallel processing apparatus, according to an embodiment.

FIG. 1 is an explanatory diagram illustrating an operation example of a parallel processing apparatus 101 according to the embodiment. The parallel processing apparatus 101 is a parallel computer system that is formed by a plurality of nodes. For example, the parallel computer system is applied to a supercomputer system provided for scientific and technical calculations as a main purpose. Each of the plurality of nodes includes a processor and a memory, respectively. Each node relays data between the nodes. A calculation node nd among the plurality of nodes executes a job such as a scientific and technical calculation. In the example of FIG. 1, the parallel processing apparatus 101 includes 14 calculation nodes nd.

An input/output (IO) node among the plurality of nodes includes a non-volatile storage device, in addition to the processor and the memory. As the non-volatile storage device, for example, a hard disk drive (HDD), a solid state drive (SSD), or the like may be used. Hereinafter, the non-volatile storage device included in the IO node is referred to as a disk. In the example of FIG. 1, the parallel processing apparatus 101 includes an IO node I0 and an IO node I1 as the IO node. The IO node I0 includes a disk d0. The IO node I1 includes a disk d1.

Here, among the plurality of nodes, even in a case where there is a failure node in which a failure occurs, the parallel processing apparatus 101 performs information collection processing for investigating a cause of occurrence of the problem in the failure node, without stopping jobs of other calculation nodes nd. In the following description, the failure node is referred to as a "down node". A node that collects information stored in the memory of the down node and converts the collected information into an output format is referred to as a "collection node". The collection node is one of the calculation nodes nd. A node that stores the converted information is referred to as a "storage node". The storage node is one of the IO nodes. The information stored in the memory of the down node is referred to as "down information".

In the information collection processing, the collection node converts the down information that passed through any route from the down node to the collection node into an output format, and the storage node stores the down information in the output format that passed through any route from the collection node to the storage node.

However, there is a case where the information collection processing is performed through a communication route that is used by each node during the execution of a job, or through a node in execution of a job. This causes an influence on the job that is being executed in each node. As the influence, for example, a calculation delay, a disturbance in synchronization processing, or the like is included. For example, it is assumed that, when determining a route from the down node to the collection node, a node that relays the information stored in the down node is determined in terms of a distance from the down node. In this case, if the node in execution of a job relays the information stored in the down node, the execution of the job in the node that relays the information becomes slow.

Here, in order to suppress the influence on the node in execution of a job, a method that acquires a processing state of each node at a period of, for example, one minute or less, and determines a route to suppress the influence on the node in execution of a job is considered. As the processing state of each node, for example, the number of issues of an idle instruction, a situation of issues of a synchronization instruction between nodes, an amount of traffic between nodes, a load of a central processing unit (CPU), a connection state between nodes, and the like are included.

However, when the processing, which acquires a processing state of each node from the each node and determines which route to use from the processing state of the each node, is performed by a specific node, a load applied to the specific node increases, and an influence on the job that is being executed in the specific node increases. In addition, as the number of nodes increases, this phenomenon will be noticeable. Further, although the load applied to the specific node may be reduced when a period of acquiring the processing state of each node becomes longer, a discrepancy between the processing state of each node at the time of acquiring the processing state and the processing state of each node at the time of actually determining the route increases.

Therefore, in the embodiment, a method that sequentially relays data, to which an evaluation value for the communication performance of each node is added, in a direction from the collection node with low power consumption to the down node and the storage node, and determines a route based on the evaluation value included in the data relayed in each direction, will be described.

In the left diagram of FIG. 1, a state where a down node P occurs from among calculation nodes nd in a plurality of nodes is illustrated.

First, a management node md determines a collection node An based on the power consumption of each node and/or the memory usage of each node in the plurality of nodes. Similarly, the management node md determines a storage node In from among IO nodes. In the example of FIG. 1, the management node md determines a calculation node nd0 that is a node with lowest power consumption among 14 calculation nodes nd, as a collection node An. The management node md determines a node I0 that is a node with lowest power consumption among nodes I0 and I1, as a storage node In. Here, in a case where there is only one IO node, or in a case where there are a plurality of IO nodes but there is only one IO node which is not failed, the management node md determines the storage node In without considering any parameter.

Here, the positional relationship among the collection node An, the down node P, and the storage node In in the example of FIG. 1 will be described. As illustrated in the left diagram of FIG. 1, it is assumed that the down node P is positioned two hops away in the rightward direction and one hop away in the downward direction from the collection node An. It is assumed that the storage node In is positioned one hop away in the leftward direction and two hops away in the downward direction from the collection node An. A node at the position one hop away in the rightward direction from the collection node An is set as a node nd1, and a node at the position one hop away in the downward direction from the collection node An is set as a node nd2. A node at the position two hops away in the rightward direction from the collection node An, and a node at the position one hop away in the rightward direction and one hop away in the downward direction from the collection node An, are adjacent to the down node P. A node adjacent to the down node P is referred to as an "adjacent node". A node at the position two hops away in the rightward direction from the collection node An is set as an adjacent node ad1, and a node at the position one hop away in the rightward direction and one hop away in the downward direction from the collection node An is set as an adjacent node ad2. In FIGS. 1, 9, 11, and 14, the adjacent nodes are denoted by a figure having a hexagonal contour.

Next, as illustrated by (1) in the left-side diagram of FIG. 1, the management node md transmits an instruction for executing information collection processing, which collects a memory dump of the down node P and stores the data that is converted to an output format in the storage node In, to the collection node An. The instruction includes the coordinate position of the down node P or the storage node In.

Upon receiving the instruction, the collection node An transmits data including a transmission instruction of an evaluation value for the communication performance of each node, to a direction approaching the down node P and a direction approaching the storage node In, respectively. Hereinafter, the data is referred to as a "check packet". The check packet includes the coordinate position of the down node P or the storage node In, which is a destination of the check packet.

In the example of FIG. 1, an example of transmitting the check packet in the direction approaching the down node P is illustrated. The direction approaching the down node P includes two directions of a rightward direction and a downward direction. Therefore, as illustrated by (2) in the left-side diagram of FIG. 1, the collection node An transmits the check packet cp1 to each direction of the rightward direction and the downward direction. Although not illustrated in the left-side diagram of FIG. 1, the collection node An also transmits the check packet in the direction approaching the storage node In. The transmission of the check packet in the direction approaching the storage node In may be triggered, at the same time as or after the transmission of the check packet in the direction approaching the down node P.

The evaluation value for the communication performance of each node may be an index value that indicates the processing state of the node described above. For example, the evaluation value may be a value that indicates a usage rate of a CPU by using a numerical value between 0 and 10, a value that indicates a usage rate of a buffer used for communication as a communication load factor by using a numerical value between 0 and 10, or a value of the sum of the two values described above. The evaluation value for the communication performance of each node is hereinafter referred to as an "evaluation value of the node". The smaller evaluation value may indicate better communication performance, or the larger evaluation value may indicate better communication performance. In the embodiment, each node calculates the evaluation value as in the following equation (1).

$$\text{Evaluation value} = (\text{CPU occupancy ratio}*100/10 + \text{communication load factor}*100/10)/2 \quad (1)$$

Figure 9:
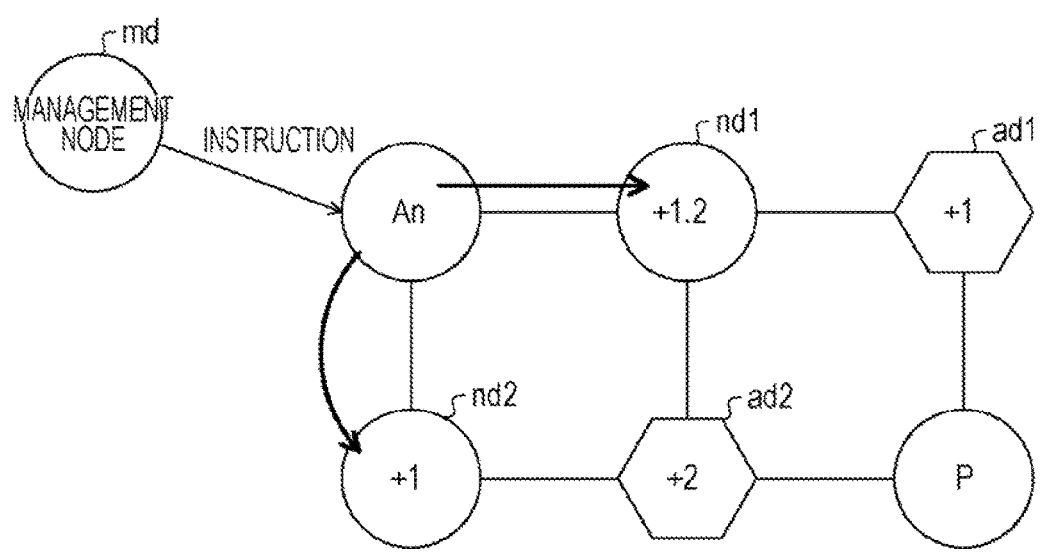
FIG. 9 is a diagram illustrating an example of transmitting a check packet, according to an embodiment.
Figure 11:
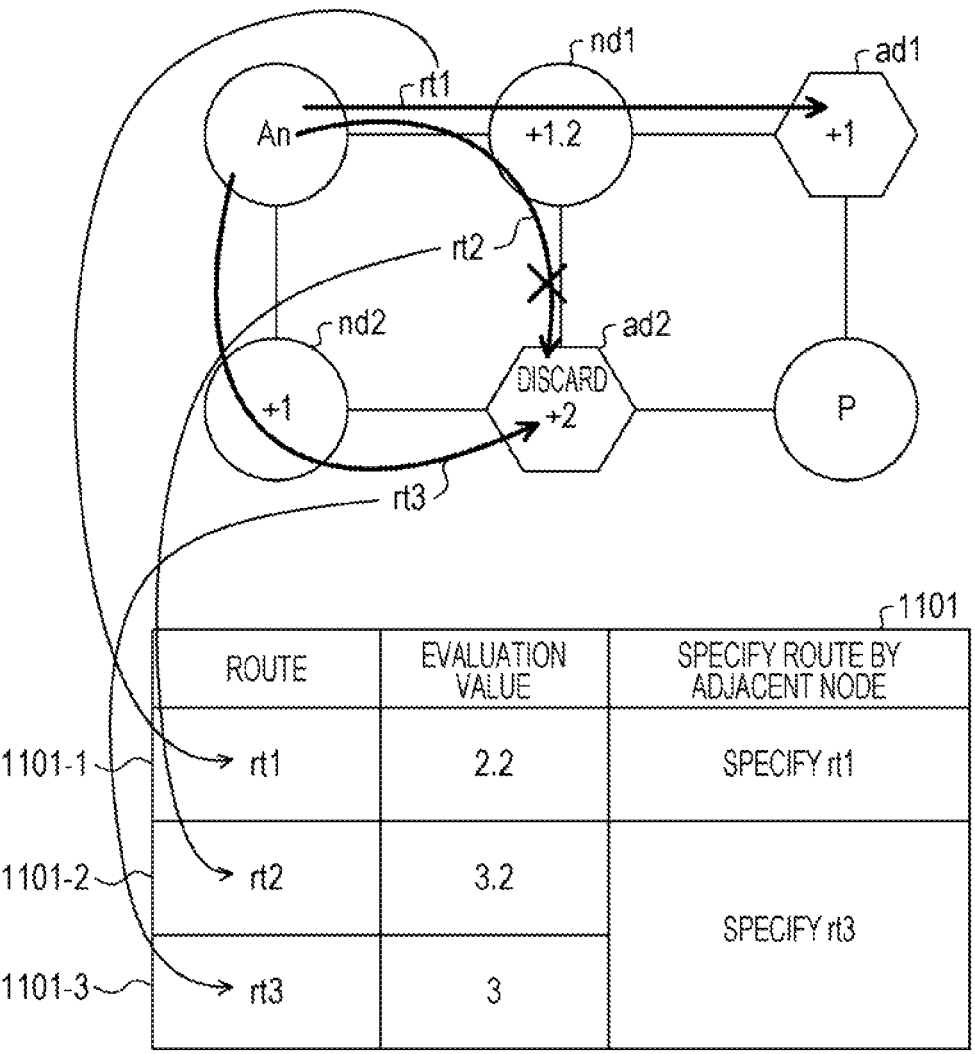
FIG. 11 is a diagram illustrating an example of an operation of a node in which a check packet is received, according to an embodiment.
Figure 14:
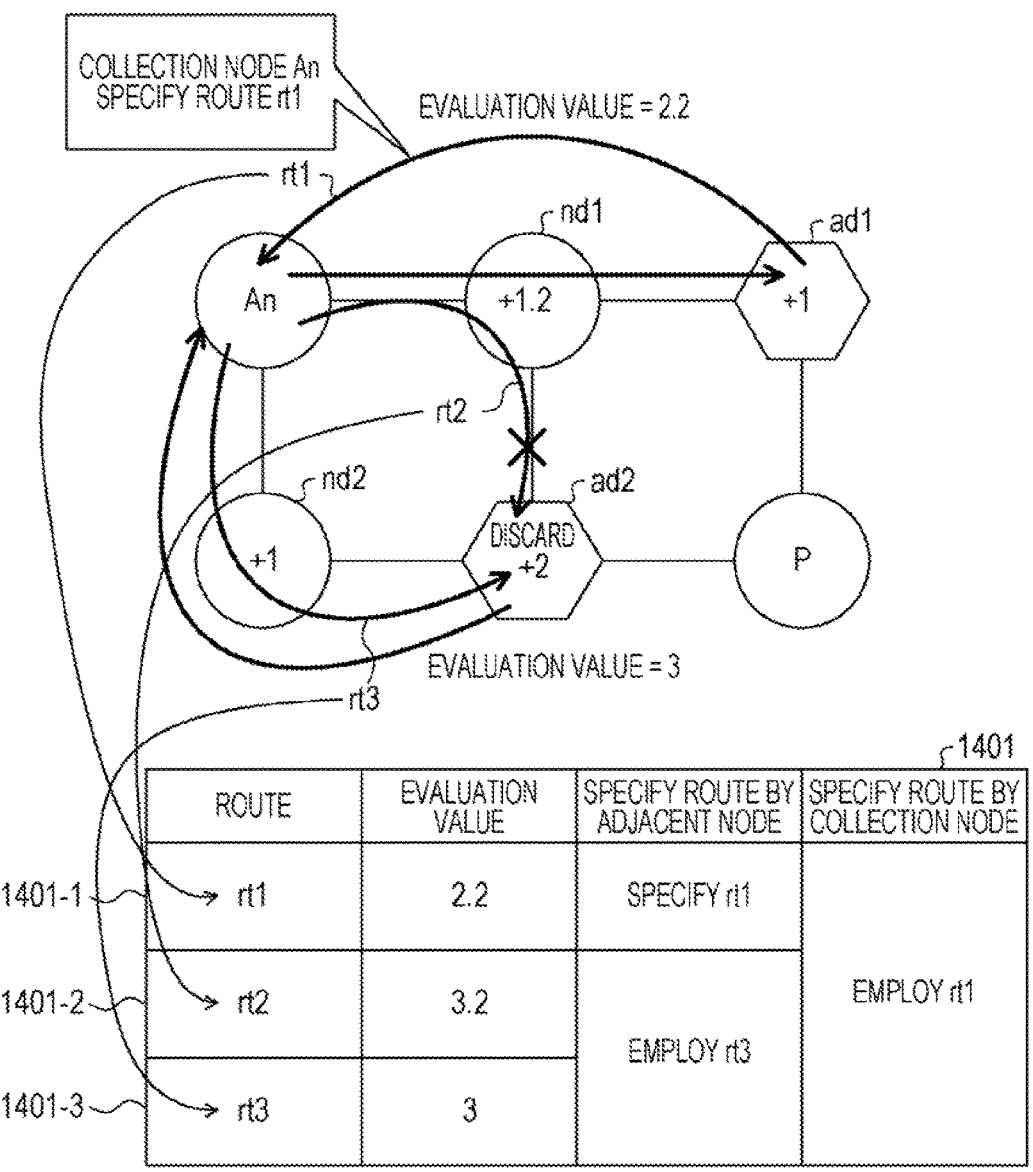
FIG. 14 is a diagram illustrating an example of an operation of a collection node in which a check packet is received, according to an embodiment.

The CPU occupancy ratio and the communication load factor take on a value from 0% to 100%. As illustrated by equation (1), in the embodiment, it is assumed that the smaller evaluation value indicates better communication performance. In the example of FIG. 1, the numerical values that are illustrated at the inside of the nodes nd1 and nd2 and the adjacent nodes ad1 and ad2 indicate the evaluation values of each node. In FIGS. 9, 11, and 14, the evaluation values of the nodes are illustrated using the same expression.

The nodes nd1 and nd2, which have received the check packets cp1, are nodes that are neither the adjacent nodes ad nor the storage nodes In. It is assumed that a node that is neither the adjacent node ad nor the storage node In receives the check packet which is transmitted in the direction approaching the down node P, the check packet including the transmission instruction of the evaluation value. In this case, the node transmits the check packet, which is obtained by adding the evaluation value of each node to the received check packet, in the direction approaching the down node P. Further, it is assumed that each node that is neither the adjacent node ad nor the storage node In receives a check packet which is transmitted in the direction approaching the storage node In, where the check packet includes the transmission instruction of the evaluation value. In this case, each node transmits the check packet obtained by adding the evaluation value of the each node to the received check packet, in the direction approaching the storage node In.

For example, each node transmits a check packet to which the evaluation value of the each node is added such that the check packet approaches the down node P or the storage node In by referring to the coordinate position of the down node P or the storage node In, which is included in the check packet. In addition, as an example of adding the evaluation value of each node, the evaluation value of the each node may be added to or subtracted from the value which is included in the check packet and stores the evaluation value, or the evaluation value of the each node may be added to a new item added in the check packet. In the following description, an example of adding the evaluation value of each node to the value, which is included in the check packet and stores the evaluation value, will be described. It is assumed that the evaluation value "0" is stored in the check packet cp1 transmitted by the collection node An.

In the example of FIG. 1, as illustrated by (3) in the left-side diagram of FIG. 1, the node nd1 transmits the check packet cp2 including the evaluation value that is obtained by adding the evaluation value "+1.2" of the node nd1 to the evaluation value "0" in the check packet cp1, to the rightward direction and the downward direction as the direction approaching the down node P. Similarly, as illustrated by (4) in the left-side diagram of FIG. 1, the node nd2 transmits the check packet cp3 including the evaluation value that is obtained by adding the evaluation value "+1" of node nd2 to the evaluation value "0" in the check packet cp1, to the rightward direction as the direction approaching the down node P.

The adjacent nodes ad1 and ad2 that receive the check packets cp2 and cp3, as described above, are nodes adjacent to the down node P. Here, the operation of the adjacent node ad and the storage node In will be described. It is assumed that the adjacent node ad receives the check packet including the transmission instruction that is transmitted in the direction approaching the down node P. In this case, the adjacent node ad transmits the check packet including the evaluation value of the adjacent node ad and the evaluation value of another node that is included in the received check packet, to the collection node An. Similarly, it is assumed that the storage node In receives the check packet including the transmission instruction that is transmitted in the direction approaching the storage node In. In this case, the storage node In transmits the check packet including the evaluation value of the storage node In and the evaluation value of another node that is included in the received check packet, to the collection node An.

The route through which the check packet is transmitted from the adjacent node ad or the storage node In to the collection node An may be any route. In the case of the adjacent node ad or the storage node In having received the check packet, since a check packet transmitted by the collection node An reaches the destination node, a check packet to be transmitted to the collection node An does not include a transmission instruction of the evaluation value of each node.

As an example in which the evaluation value of another node and the evaluation value of each node are included in the check packet, the adjacent node ad and the storage node In may include a value, which is obtained by adding or subtracting the evaluation value of the each node to or from the evaluation value of another node, in the check packet. Alternatively, the adjacent node ad and the storage node In may add the evaluation value of each node to a new item added in the received check packet.

In the example of FIG. 1, as illustrated by (5) in the right-side diagram of FIG. 1, the adjacent node ad1 transmits the check packet cp4 including the evaluation value "2.2", which is obtained by adding the evaluation value "+1" of the adjacent node ad1 to the evaluation value "1.2" included in the received check packet cp2, to the collection node An. Similarly, as illustrated by (6) in the right-side diagram of FIG. 1, the adjacent node ad2 transmits the check packet cp5 including the evaluation value "3", which is obtained by adding the evaluation value "+1" of the adjacent node ad2 to the evaluation value "2" included in the received check packet cp3, to the collection node An. Similarly, as illustrated by (7) in the right-side diagram of FIG. 1, the storage node In transmits the check packet cp6 including the evaluation value, which is obtained by adding the evaluation value of the storage node In to the evaluation value included in the check packet received by the storage node In, to the collection node An.

Upon receiving the check packet including the evaluation value of the adjacent node ad, the collection node An determines a transmission route between the down node P and the collection node An, based on the received check packet. Upon receiving the check packet including the evaluation value of the storage node In, the collection node An determines a transmission route between the collection node An and the storage node In, based on the received check packet. As illustrated by (8) in the right-side diagram of FIG. 1, the collection node An determines route rt1 of the check packet cp4 including a good evaluation value, based on the evaluation value "2.2" and the evaluation value "3" in the respective check packets cp4 and cp5, as a transmission route between the down node P and the collection node An. Similarly, as illustrated by (9) in the right-side diagram of FIG. 1, the collection node An determines route rt2 of the check packet cp6, as a transmission route between the collection node An and the storage node In.

As described above, the parallel processing apparatus 101 is able to determine a transmission route between the down node P and the collection node An and a transmission route between the collection node An and the storage node In, without applying a large load on a particular node such as the collection node An. Since the collection node An is a node with low power consumption and low memory usage, even when the information collection processing is executed by the collection node An, it is possible to suppress the influence on the job that is being executed by the collection node An.

After the routes rt1 and rt2 are determined, the collection node An transmits an instruction for relaying the down information to each node included in the determined route rt1. The collection node An transmits an instruction for converting the down information obtained by the instruction, relaying the converted down information, and storing the converted down information in the disk d0 of the storage node In, to each node included in the determined route rt2. As described above, the parallel processing apparatus 101 is able to collect and convert the down information, and store the converted down information in the storage node In, while suppressing the influence on the job that is being executed in each node. Next, a configuration example of the parallel processing apparatus 101 will be described with reference to FIG. 2.

Figure 2:
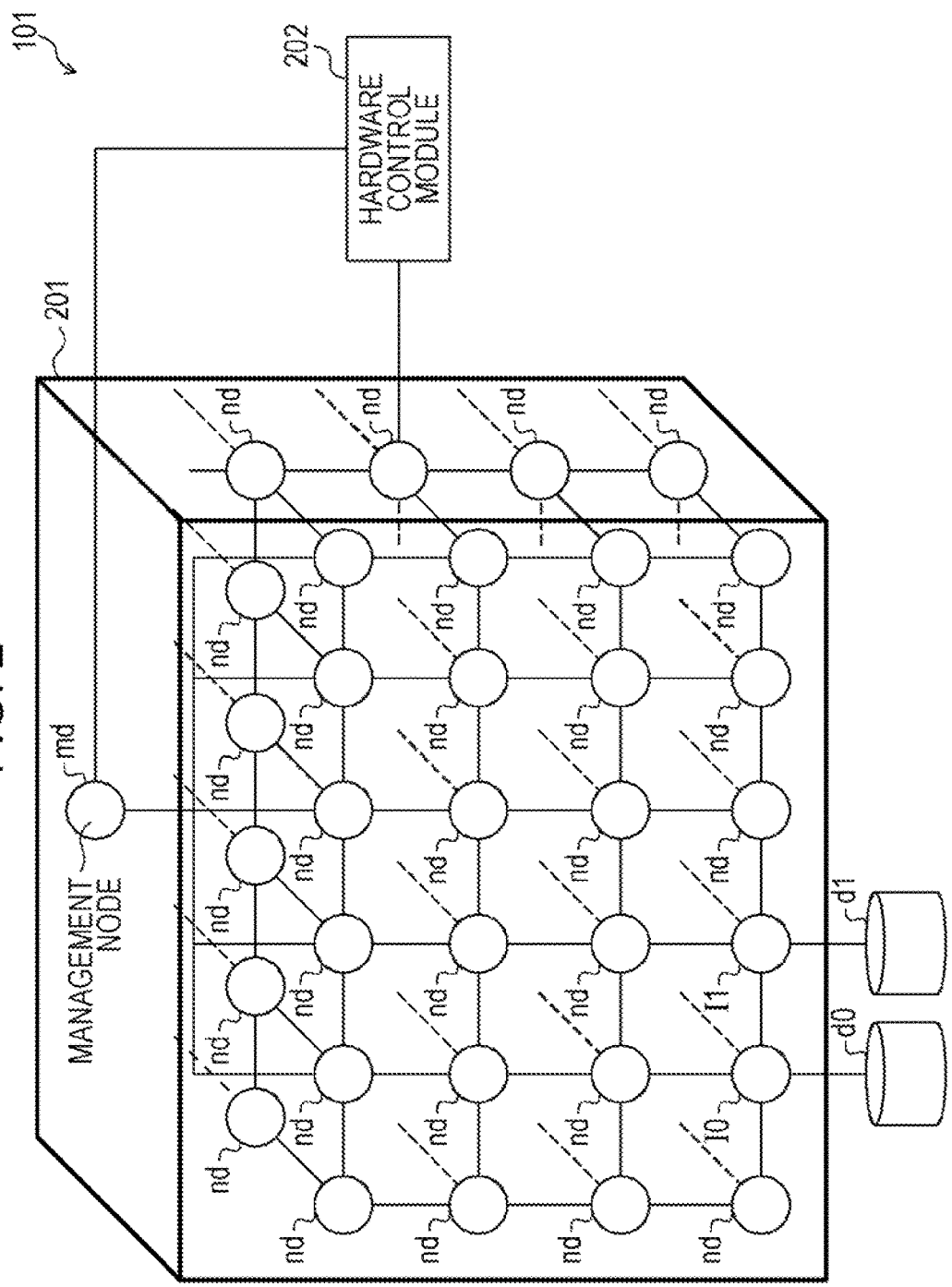
FIG. 2 is a diagram illustrating an example of a configuration of a parallel processing apparatus, according to an embodiment.

FIG. 2 is an explanatory diagram illustrating a configuration example of the parallel processing apparatus 101. As illustrated in FIG. 2, the parallel processing apparatus 101 includes a hardware control module 202, and a plurality of nodes including a management node md, calculation nodes nd, and IO nodes I0 and I1. The calculation nodes nd and the IO nodes I0 and I1 are included in a housing 201. As illustrated in FIG. 2, the calculation nodes nd are coupled to the IO nodes I0 and I1 in a three-dimensional structure. The configuration in which the calculation nodes nd are coupled to the IO nodes I0 and I1 in a three-dimensional structure is an example, and the calculation nodes nd may be coupled to the IO nodes I0 and I1 on the same plane. For simplification of the drawings, in FIGS. 5, 7, 9, 11, 12, and 14, the calculation nodes nd and the IO nodes I0 and I1 that are coupled to each other on the same plane are displayed, and the display of the calculation nodes on the other planes is omitted.

The hardware control module 202 is a device that collects the power consumption values and the memory usage of the calculation nodes nd and the IO nodes I0 and I1. Next, a hardware configuration example of each node of the plurality of nodes will be described with reference to FIG. 3.

Figure 3:
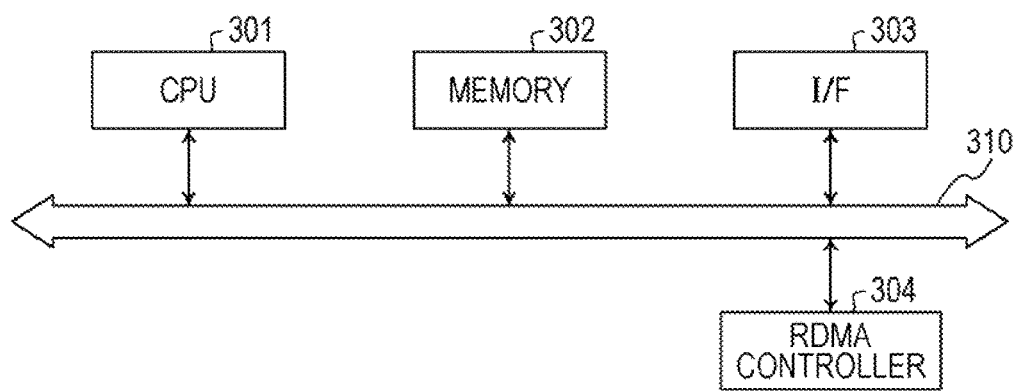
FIG. 3 is a diagram illustrating an example of a hardware configuration of a node, according to an embodiment.

FIG. 3 is an explanatory diagram illustrating an example of a hardware configuration of the node. In FIG. 3, the node includes a CPU 301, a memory 302, an interface (I/F) 303, and a remote direct memory access (RDMA) controller 304. The components are coupled to each other via a bus 310.

Here, the CPU 301 is a control device that controls the entire of the node. The memory 302 is a storage device that includes, for example, a read only memory (ROM), a random access memory (RAM), a flash ROM, and the like. More specifically, for example, the flash ROM stores a program such as an operating system (OS) or firmware, the ROM stores an application program, and the RAM is used as a work area of the CPU 301. The program stored in the memory 302 is loaded into the CPU 301, and thus the program causes the CPU 301 to execute the coded processing.

The I/F 303 is a device that controls input and output of the data from and to another node. Specifically, the I/F 303 is coupled to a computer network that couples nodes, which is called as interconnect.

The RDMA controller 304 is a device that performs direct memory access (DMA) transmission between the memory 302 of the node and the memory 302 of another node.

Functional Configuration Example of Parallel Processing Apparatus

Figure 4:
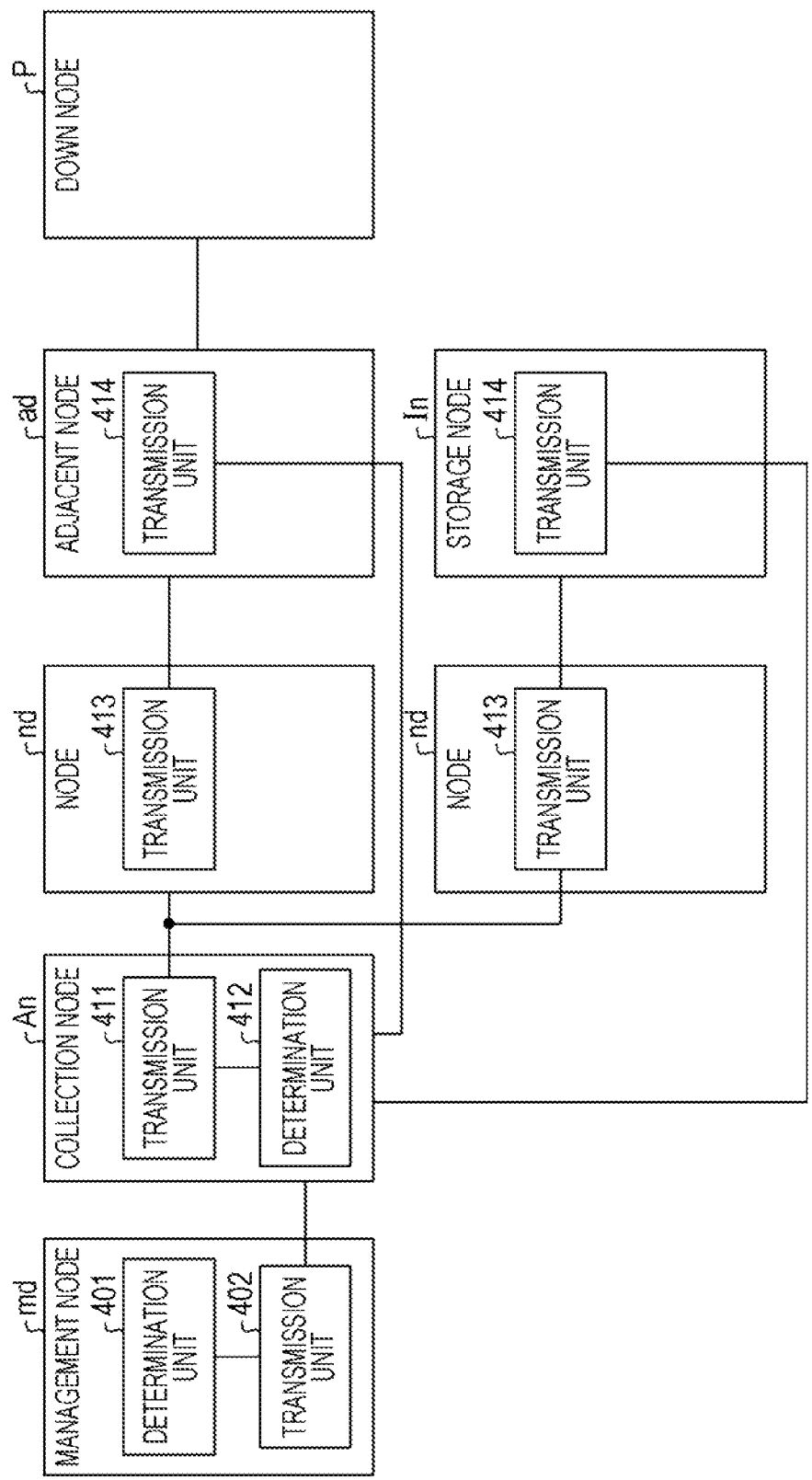
FIG. 4 is a diagram illustrating an example of a functional configuration of a parallel processing apparatus, according to an embodiment.

FIG. 4 is an explanatory diagram illustrating an example of a functional configuration of the parallel processing apparatus 101. The parallel processing apparatus 101 includes a determination unit 401, a transmission unit 402, a transmission unit 411, a determination unit 412, and transmission units 413 and 414. The control units from the determination unit 401 to the transmission unit 414 realize functions of the respective units by executing the program stored in the storage device by the CPU 301 of each node. The storage device, specifically, for example, includes a ROM, a flash ROM, and the like of the node. The processing result of each unit is stored in the register of the CPU 301, the cache memory of the CPU 301, or the like.

The determination unit 401 and the transmission unit 402 correspond to the functions of the management node md. For example, when a node in which the program stored in the storage device is executed determines that the own node is a management node md, the node realizes the functions indicated by the determination unit 401 and the transmission unit 402.

The transmission unit 411 and the determination unit 412 correspond to the functions of a node that is a collection node An among the calculation nodes nd. For example, when a node in which the program stored in the storage device is executed determines that the own node is the collection node An, the node realizes the functions indicated by the transmission unit 411 and the determination unit 412.

The transmission unit 413 corresponds to the function of a node in which the check packet is received and which is neither the adjacent node ad nor the storage node In, among the plurality of nodes. For example, when a node in which the program stored in the storage device is executed receives the check packet, and determines that the own node is neither the adjacent node ad nor the storage node In, the node realizes the function indicated by the transmission unit 413.

The transmission unit 414 corresponds to the functions of the adjacent node ad and the storage node In. For example, when a node in which the program stored in the storage device is executed determines that the own node is an adjacent node ad or a storage node In, the node realizes the function indicated by the transmission unit 414.

Therefore, although a node in which the program stored in the storage device is executed includes all the units from the determination unit 401 to the transmission unit 414, some of the units are not illustrated in FIG. 4.

When the down node P occurs, the determination unit 401 determines a collection node An from among the calculation nodes nd, based on the power consumption of each calculation node nd and/or the memory usage of each node. For example, the determination unit 401 determines a calculation node nd having the lowest power consumption or the lowest memory usage among the calculation nodes nd, as the collection node An, by referring to the information collected by the hardware control module 202. Alternatively, the determination unit 401 specifies several calculation nodes nd in ascending order of power consumption of each calculation node nd, and determines the calculation node nd having the lowest memory usage among the several calculation nodes nd, as the collection node An. The specific determination method of the collection node An will be described with reference to FIG. 7.

The determination unit 401 determines a storage node In from the IO nodes, based on the power consumption and/or the memory usage of each node of the IO nodes. As the determination method of the storage node In, the same method as the determination method of the collection node An may be used. The specific determination method of the storage node In storage node will be described with reference to FIG. 7.

The transmission unit 402 transmits data that is generated based on the down information of the down node P and includes an instruction for storing the converted down information in the storage node In, to the collection node An determined by the determination unit 401.

Upon receiving the instruction from the transmission unit 402, the transmission unit 411 transmits a check packet including a transmission instruction of the evaluation value of each node, in the direction approaching the down node P and in the direction approaching the storage node In, respectively.

Upon receiving the check packet including the evaluation value of the adjacent node ad, the determination unit 412 determines a transmission route between the down node P and the collection node An, based on the received check packet. Upon receiving the check packet including the evaluation value of the storage node In, the determination unit 412 determines a transmission route between the collection node An and the storage node In, based on the received check packet. For example, when an evaluation value included in the received check packet is the evaluation value itself of each node, the determination unit 412 sums up the respective evaluation values included in the received check packet. Upon receiving a plurality of check packets, the determination unit 412 determines a route indicated by the check packet having the best evaluation value, as a transmission route between the down node P and the collection node An.

Upon receiving a check packet that is transmitted in the direction approaching the down node P and includes a transmission instruction of the evaluation value, the transmission unit 413 of a node nd transmits a check packet obtained by adding the evaluation value of the own node nd to the received check packet, in the direction approaching the down node P. Upon receiving a check packet that is transmitted in the direction approaching the storage node In and includes a transmission Instruction of the evaluation value, the transmission unit 413 of a node nd transmits a check packet obtained by adding the evaluation value of the own node nd to the received check packet, in the direction approaching the storage node In.

Here, the transmission unit 413 does not have to specify whether the check packet is transmitted in the direction approaching the down node P or in the direction approaching the storage node In. Specifically, the transmission unit 413 may transmit the check packet according to the coordinate position of the down node P or the storage node In that is included in the check packet and is the destination of the check packet. As a result, when the received check packet is a check packet that is transmitted in the direction approaching the down node P, the check packet obtained by adding the evaluation value of the own node nd to the received check packet is transmitted by the transmission unit 413, in the direction approaching the down node P. Similarly, when the received check packet is the check packet that is transmitted in the direction approaching the storage node In, the check packet obtained by adding the evaluation value of own node to the received check packet is transmitted by the transmission unit 413, in the direction approaching the storage node In.

The transmission unit 413 may transmit a check packet including the evaluation value obtained by adding the evaluation value of the own node nd to the evaluation value of another node, which is included in the received check packet, in the direction approaching the down node P or in the direction approaching the storage node In.

It is assumed that a node, which is neither the adjacent node ad nor the storage node In, receives a plurality of check packets which are transmitted in the direction approaching the down node P or the storage node In, and include the transmission instructions of the evaluation values. In this case, the transmission unit 413 specifies a check packet among the plurality of check packets, based on the evaluation value of another node that is included in each check packet of the plurality of check packets. The transmission unit 413 may transmit the check packet obtained by adding the evaluation value of the own node nd to the specified check packet, in the direction approaching the down node P or the storage node In.

It is assumed that the adjacent node ad or the storage node In receives a check packet which is transmitted in the direction approaching the down node P or the storage node In, and includes the transmission instruction of the evaluation value. In this case, the transmission unit 414 transmits a check packet including the evaluation value of another node that is included in received check packet and the evaluation value of the own node, to the collection node An. The transmission unit 414 may transmit a check packet including the evaluation value obtained by adding the evaluation value of another node and the evaluation value of the own node, to the collection node An.

It is assumed that the adjacent node ad or the storage node In receives a plurality of check packets which are transmitted in the direction approaching the down node P or the storage node In and include a transmission instruction of the evaluation value. In this case, the transmission unit 414 specifies a check packet among the plurality of check packets, based on the evaluation value of another node that is included in each of the plurality of check packets. The transmission unit 414 transmits the check packet including the evaluation value of another node that is included in the specified check packet and the evaluation value of the own node, to the collection node An.

Next, a function using first identification information indicating that a check packet approaches the down node P and second identification information indicating that a check packet approaches the storage node In will be described. The transmission unit 411 transmits a check packet including a first identification information and a transmission instruction, in the direction approaching the down node P. The transmission unit 411 transmits a check packet including the second identification information and the transmission instruction, in the direction approaching the storage node In.

Upon receiving a check packet including the first identification information, the transmission unit 413 transmits a check packet obtained by adding the evaluation value of the own node to the received check packet, in the direction approaching the down node P. Upon receiving a check packet including the second identification information, the transmission unit 413 transmits a check packet obtained by adding the evaluation value of the own node to the received check packet, in the direction approaching the storage node In.

Upon receiving the check packet including the first identification information or the second identification information, the transmission unit 414 transmits a check packet obtained by adding the evaluation value of the own node to the received check packet, to the collection node An.

Upon receiving a check packet including the first identification information, the determination unit 412 determinates a transmission route between the down node P and the collection node An, based on the received check packet. Upon receiving a check packet including the second identification information, the determination unit 412 determinates a transmission route between the collection node An and the storage node In, based on the received check packet.

Next, the processing after the transmission route is determined will be described. The transmission unit 402 transmits an instruction for relaying the down information of the down node P, to each node included in the determined route between the down node P and the collection node An. The transmission unit 402 transmits an instruction for converting the down information obtained by the instruction described above, relaying the converted down information, and storing the converted down information in the disk of the storage node In, to each node included in the determined route between the collection node An and the storage node In.

Figure 5:
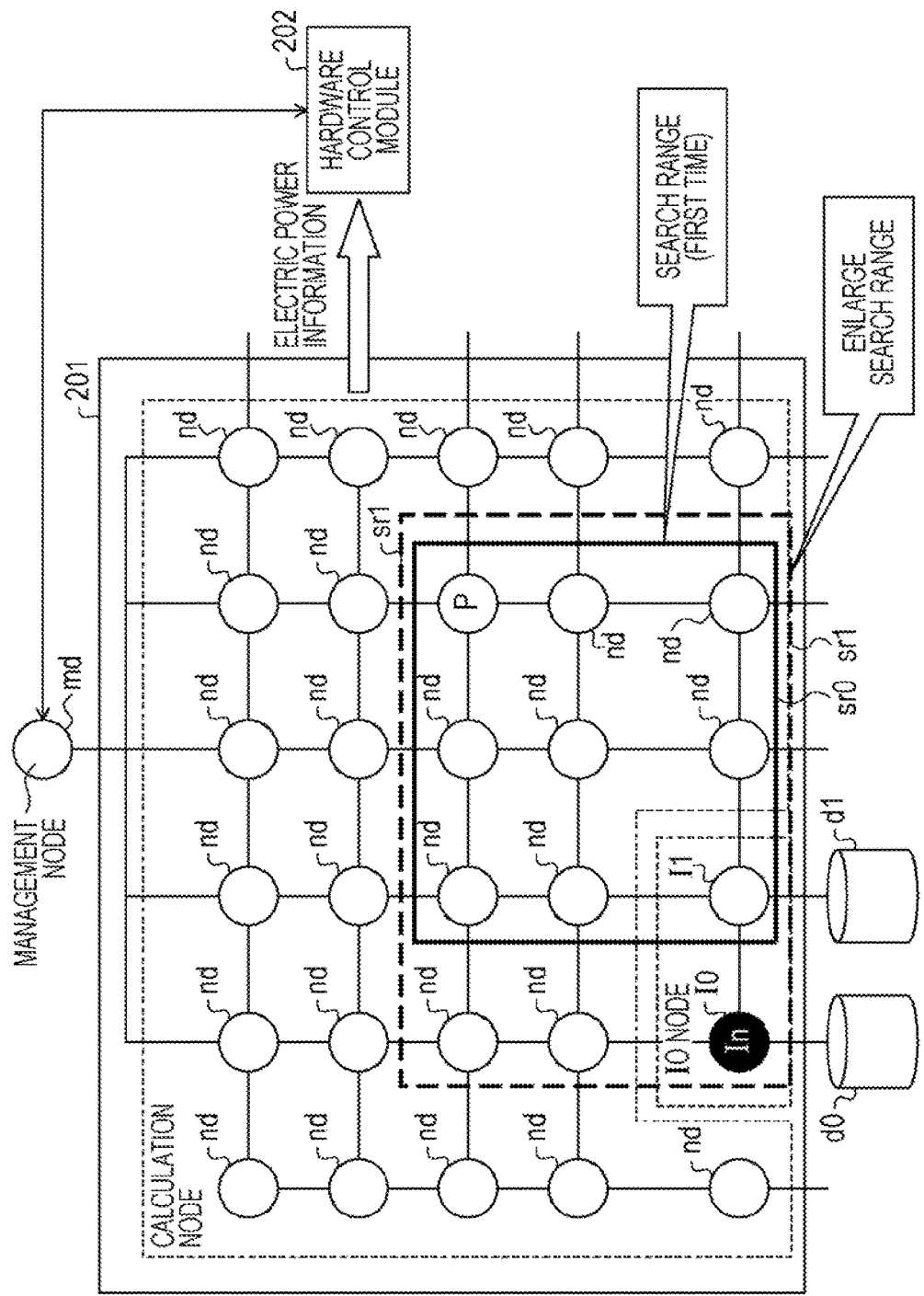
FIG. 5 is a diagram illustrating an example of determining a storage node, according to an embodiment.

FIG. 5 is an explanatory diagram illustrating an example of determining the storage node In. As illustrated in FIG. 5, the management node md determines a node In that outputs the dump of the down node P, based on the power consumption values of the IO nodes which are acquired from the hardware control module 202. Here, when there is an IO node whose power consumption is equal to or less than a predetermined value, among IO nodes included in a rectangular parallelepiped that includes the down node P and one or more IO nodes as a search range for the first time, the management node md determines the IO node as the node In. When there is no IO node whose power consumption is equal to or less than the predetermined value, the management node md sets a range obtained by enlarging one side of the rectangular parallelepiped, as a next search range, and repeats the determination processing of the storage node In until there is an IO node whose power consumption is equal to or less than the predetermined value, among IO nodes included in the search range.

In the example of FIG. 5, it is assumed that the power consumption of the node I1 is larger than the predetermined value and the power consumption of the node I0 is equal to or less than the predetermined value. The range sr0 indicated by the solid line of the thick frame is the search range for the first time. The management node md determines that the power consumption of the node I1 included in the range sr0 is larger than the predetermined value, and sets the range sr1 that is obtained by enlarging the range sr0 and illustrated by the dashed line of the thick frame, as a next search range. The management node md determines that the power consumption of the node I0 included in the range sr1 is equal to or less than the predetermined value, and determines the node I0 as the storage node In. In the example of FIG. 5, the node I0 that is determined as the storage node In is displayed in a state filled with black. Next, a flowchart illustrating the determination processing of the storage node In will be described with reference to FIG. 6.

Figure 6:
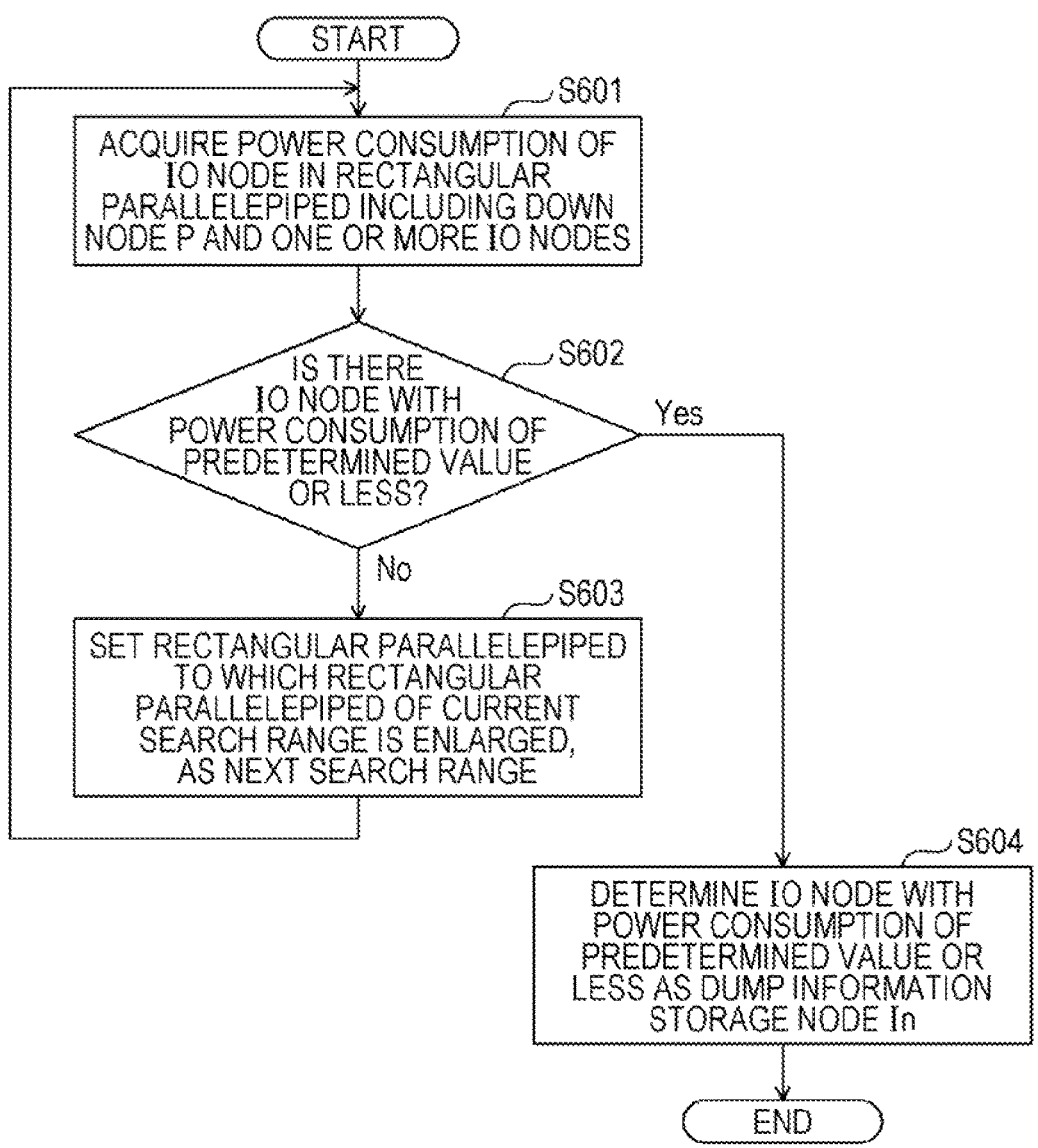
FIG. 6 is a diagram illustrating an example of an operational flowchart for a determination processing procedure of a storage node, according to an embodiment.

FIG. 6 is an operational flowchart illustrating an example of the determination processing procedure of the storage node In. The determination processing of the storage node In is processing of determining the storage node In. The management node md acquires the power consumption of each IO node in the rectangular parallelepiped including the down node P and one or more IO nodes (step S601). Next, the management node md determines whether or not there is an IO node whose power consumption is equal to or less than a predetermined value (step S602). In a case where there is no IO node whose power consumption is equal to or less than the predetermined value (No in step S602), the management node md sets a rectangular parallelepiped obtained by enlarging the rectangular parallelepiped of the current search range, as a next search range (step S603). For example, the management node md sets a rectangular parallelepiped obtained by enlarging the shortest side among the sides of the rectangular parallelepiped of the current search range, by one, as a next search range.

On the other hand, in a case where there is an IO node whose power consumption is equal to or less than the predetermined value (Yes in step S602), the management node md determines the IO node with power consumption of the predetermined value or less, as the dump information storage node In (step S604). After the processing of step S604 is terminated, the management node md terminates the determination processing of the storage node In. Next, an example of determining the collection node An will be described with reference to FIG. 7.

Figure 7:
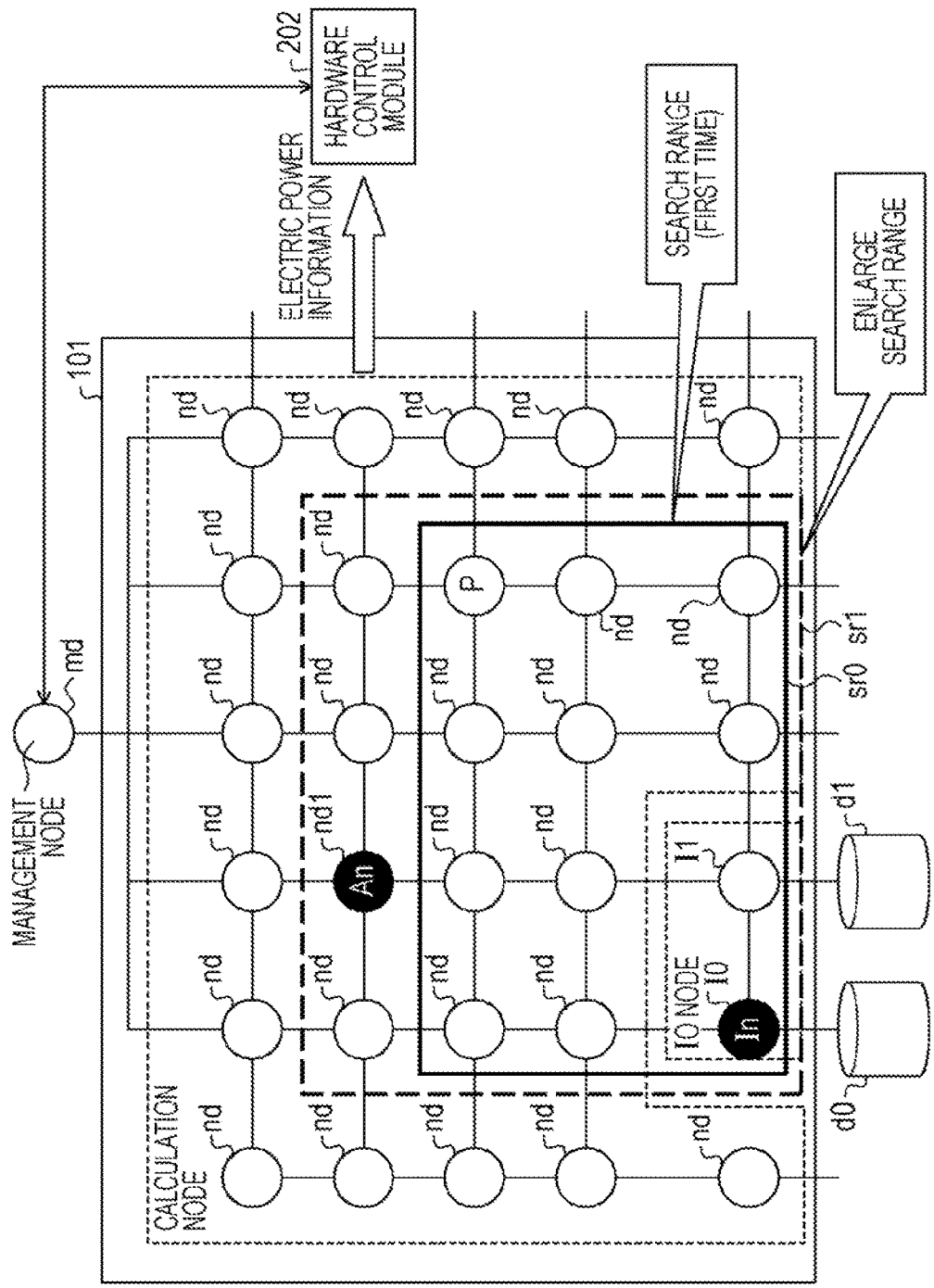
FIG. 7 is a diagram illustrating an example of determining a collection node, according to an embodiment.

FIG. 7 is an explanatory diagram illustrating an example of determining the collection node An. As illustrated in FIG. 7, the management node md determines the collection node An, based on the power consumption value of each calculation node which is acquired from the hardware control module 202. Here, when there is a calculation node whose power consumption is equal to or less than a predetermined value, among the calculation nodes included in the rectangular parallelepiped that includes the down node P and the storage node In as the search range for the first time, the management node md determines the calculation node as the collection node An. When there is no calculation node whose power consumption is equal to or less than the predetermined value, the management node md sets a range obtained by enlarging one side of the rectangular parallelepiped, as a next search range, and repeats the determination processing of the collection node until there is a calculation node whose power consumption is equal to or less than the predetermined value, among the calculation nodes included in the search range.

In the example of FIG. 7, the range sr0 indicated by the solid line of the thick frame is the search range for the first time. The management node md determines that the power consumption of all of the calculation nodes included in the range sr0 is larger than the predetermined value, and sets the range sr1 that is obtained by enlarging the range sr0 and illustrated by the dashed line of the thick frame, as a next search range. The management node md determines that the power consumption of the node nd1 included in the range sr1 is equal to or less than the predetermined value, and determines the node nd1 as the collection node An. In the example of FIG. 7, the node nd1 that is determined as the collection node An is displayed in a state filled with black. Next, a flowchart illustrating the determination processing of the collection node An will be described with reference to FIG. 8.

Figure 8:
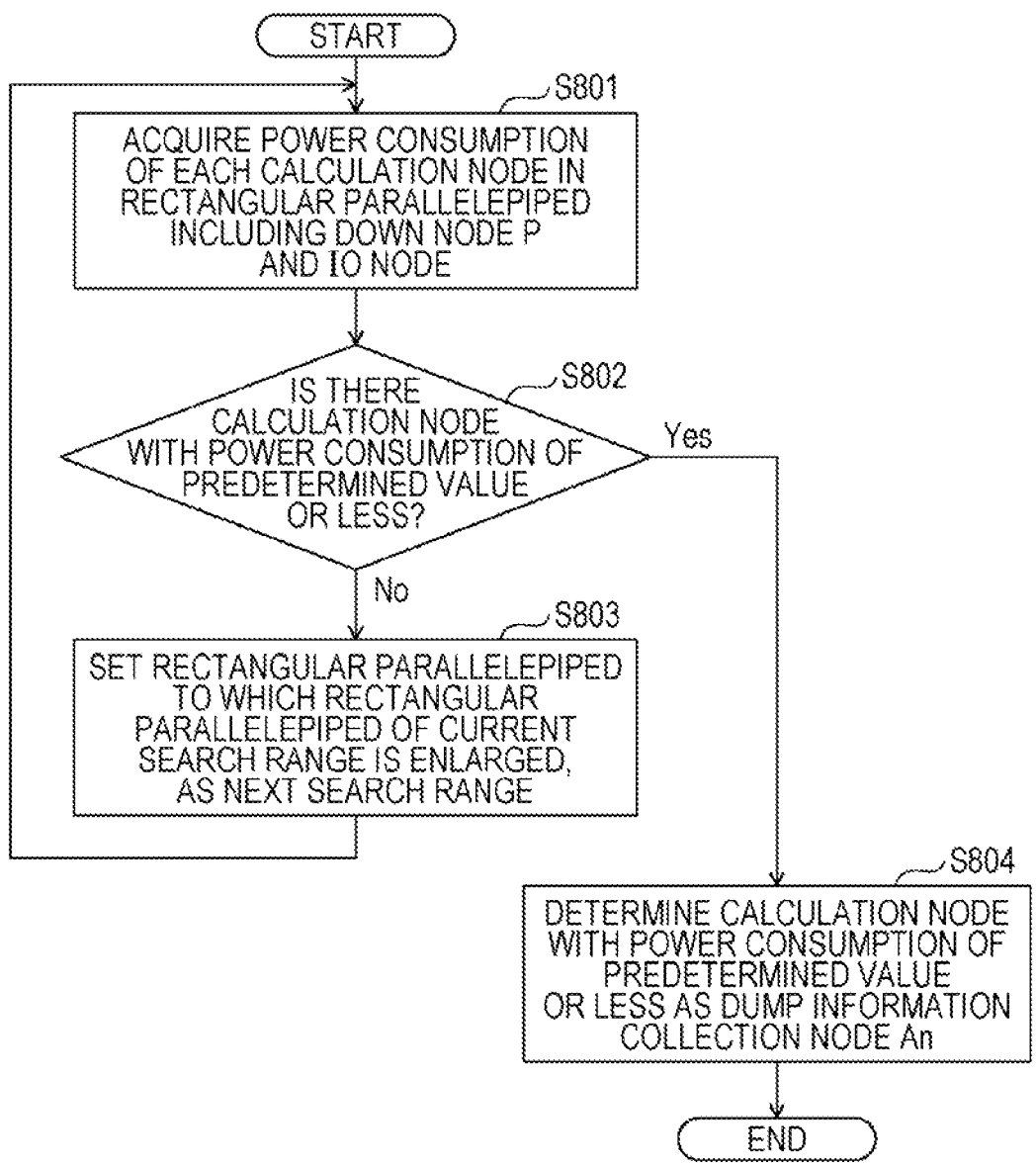
FIG. 8 is a diagram illustrating an example of an operational flowchart for a determination processing procedure of a collection node, according to an embodiment.

FIG. 8 is an operational flowchart illustrating an example of a determination processing procedure of the collection node An. The determination processing of the collection node An is processing of determining the collection node An. The management node md acquires the power consumption of each calculation node in the rectangular parallelepiped including the down node P and the IO nodes (step S801). Next, the management node md determines whether or not there is a calculation node whose power consumption is equal to or less than a predetermined value (step S802). In a case where there is no calculation node whose power consumption is equal to or less than the predetermined value (No in step S802), the management node md sets a rectangular parallelepiped obtained by enlarging the rectangular parallelepiped of the current search range, as a next search range (step S803).

On the other hand, in a case where there is a calculation node whose power consumption is equal to or less than the predetermined value (Yes in step S802), the management node md determines the calculation node with power consumption of the predetermined value or less, as the dump information collection node An (step S804). After the processing of step S804 is terminated, the management node md terminates the determination processing of the collection node An.

When the determination processing of the collection node An is terminated, the management node md collects a memory dump of the down node P, and transmits an instruction for storing the data that is converted to the output format in the storage node In, to the collection node An. Upon receiving the instruction, the collection node An transmits a check packet for determining a transmission route between the collection node An and the down node P, in the direction approaching the down node P. The collection node An transmits a check packet for determining a transmission route between the collection node An and the storage node In, in the direction approaching the storage node In.

Here, an example of transmitting the check packet in the direction approaching the down node P will be described with reference to FIG. 9. An example of the format of a check packet will be described with reference to FIG. 10. An operation example of the node in which the check packet is received will be described with reference to FIGS. 11 and 12. In FIGS. 9 and 11, it is assumed that the collection node An and the down node P are positioned on the same plane and the down node P is positioned two hops away in the rightward direction and one hop away in the downward direction from the collection node An.

A node at the position one hop away in the rightward direction from the collection node An is set as the node nd1, and the evaluation value of the node nd1 is set at 1.2. A node at the position one hop away in the downward direction from the collection node An is set as the node nd2, and the evaluation value of the node nd2 is set at 1. A node at the position two hops away in the rightward direction from the collection node An is set as the adjacent node ad1 because the node is adjacent to the upper side of the down node P, and the evaluation value of the adjacent node ad1 is set at 1.

A node at the position one hop away in the rightward direction and one hop away in the downward direction from the collection node An is set as the adjacent node ad2 because the node is adjacent to the left-side of the down node P, and the evaluation value of the adjacent node ad2 is set at 2.

FIG. 9 is an explanatory diagram illustrating an example of transmitting a check packet. The collection node An transmits the check packet in the direction approaching the down node P. In the example of FIG. 9, the collection node An transmits the check packet to the rightward direction and the downward direction approaching the down node P.

FIG. 10 is an explanatory diagram illustrating an example of a format 1001 of the check packet. In FIG. 10, the format 1001 of the check packet will be described as an example of the check packet transmitted by the collection node An illustrated in FIG. 9.

The format 1001 includes an An coordinate item, a destination node type item, a destination node coordinate item, an evaluation value item, and a route information item.

In the An coordinate item, information indicating the coordinate position of the collection node An is stored. In the destination node type item, information indicating the type of the node that is a destination of the check packet is stored. More specifically, in the destination node type item, an identifier indicating the down node P or an identifier indicating the storage node In is stored. The identifier indicating the down node P corresponds to the first identification information described in FIG. 4. The identifier indicating the storage node In corresponds to the second identification information described in FIG. 4. In the destination node coordinate item, information indicating the coordinate position of the node that is a destination of the check packet is stored. In the evaluation value item, the evaluation value of the route formed by each node through which the check packet passed is stored. Specifically, in the evaluation value item, a value obtained by summing the evaluation values of the respective nodes through which the check packet passed is stored. In the route information item, the coordinate positions of the respective nodes through which the check packet passed are stored.

In the check packet illustrated in the example of FIG. 10, in the An coordinate item, the coordinate position (Xn, Yn, Zn) of the collection node An is stored. In the check packet illustrated in the example of FIG. 10, in the destination node type item, the identifier indicating the down node P is stored, and in the destination node coordinate item, the coordinate position (Xp, Yp, Zp) of the down node P is stored. In the check packet illustrated in the example of FIG. 10, in the evaluation value item, 0 is stored, and in the route information item, the coordinate position (Xn, Yn, Zn) of the collection node An as a first node of the route is stored.

FIG. 11 is an explanatory diagram (part 1) illustrating an operation example of the node in which a check packet is received. The node in which the check packet is received specifies a check packet having the best evaluation value among the check packets received within a predetermined time after the check packet is received at first time.

In FIG. 11, the specification by the adjacent nodes ad1 and ad2 is illustrated. The table 1101 illustrated in FIG. 11 includes records 1101-1 to 1101-3. The record 1101-1 is a record indicating the route rt1 formed by the collection node An, the node nd1, and the adjacent node ad1. The record 1101-2 is a record indicating the route rt2 formed by the collection node An, the node nd1, and the adjacent node ad2. The record 1101-3 is a record indicating the route rt3 formed by the collection node An, the node nd2, and the adjacent node ad2.

The adjacent node ad1 receives a check packet indicating the route rt1. Since any other check packets are not received, the adjacent node ad1 specifies the check packet indicating the route rt1.

On the other hand, the adjacent node ad2 receives a check packet indicating the route rt2 and a check packet indicating the route rt3. Here, as illustrated by the record 1101-2, the evaluation value of the check packet indicating the route rt2 is 3.2, and as illustrated by the record 1101-3, the evaluation value of the check packet indicating the route rt3 is 3. Therefore, the adjacent node ad2 specifies the check packet indicating the route rt3 having the best evaluation value. The adjacent node ad2 discards the check packet indicating the route rt2. Here, at the time of comparing the evaluation value of a check packet with another, the adjacent node ad2 may perform a comparison by using a value in which the evaluation value of the own node is not added to the evaluation value of the received check packet, or a value obtained by adding the evaluation value of the own node to the evaluation value of the received check packet.

The node that has received the check packet adds the evaluation value of the own node to the value in the evaluation value item in the check packet. Then, the node that has received the check packet adds the coordinate position of the own node to the route information item in the check packet.

The node that has received the check packet determines whether or not the own node is adjacent to the down node P. When the node is adjacent to the down node P, the node that has received the check packet transmits the updated check packet to the collection node An. When the node that has received the check packet is not adjacent to the down node P, the node calculates distances between next-hop nodes, which are adjacent to the node and different from a previous-hop node via which the node has received the check packet, and the down node P, and transmits the updated check packet to the two next-hop nodes at the lowest level in the distance. An example of calculating the distance will be described with reference to FIG. 12.

Figure 12:
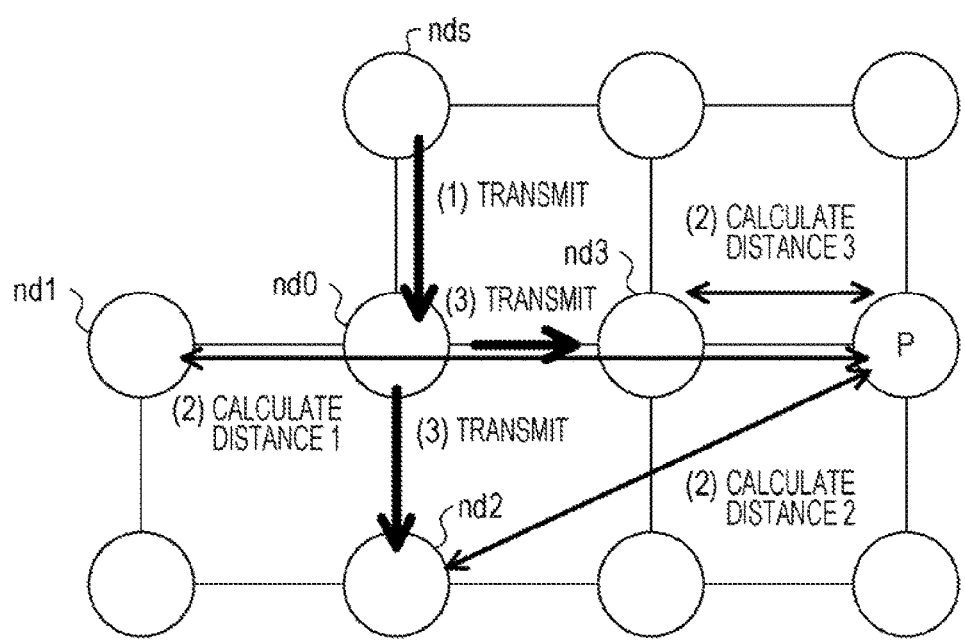
FIG. 12 is a diagram illustrating an example of an operation of a node in which a check packet is received, according to an embodiment.

FIG. 12 is an explanatory diagram (part 2) illustrating an operation example of a node in which a check packet is received. As illustrated by (1) in FIG. 12, the node nds illustrated in FIG. 12 transmits a check packet to the node nd0 illustrated in FIG. 12.

As illustrated by (2) in FIG. 12, the node nd0 that has received the check packet calculates the distance 1 between the node nd1 and the down node P, the distance 2 between the node nd2 and the down node P, and the distance 3 between the node nd3 and the down node P, where the nodes nd1, nd2, and nd3 are adjacent to the node nd0. In the example of FIG. 12, the distance 2 and the distance 3 are two at the lowest level in the distance.

Therefore, as illustrated by (3) in FIG. 12, the node nd0 transmits the check packet to the node nd2 and the node nd3. Next, a flowchart illustrating the processing of the node having received the check packet that has been transmitted in the direction approaching the down node P, will be described with reference to FIG. 13.

Figure 13:
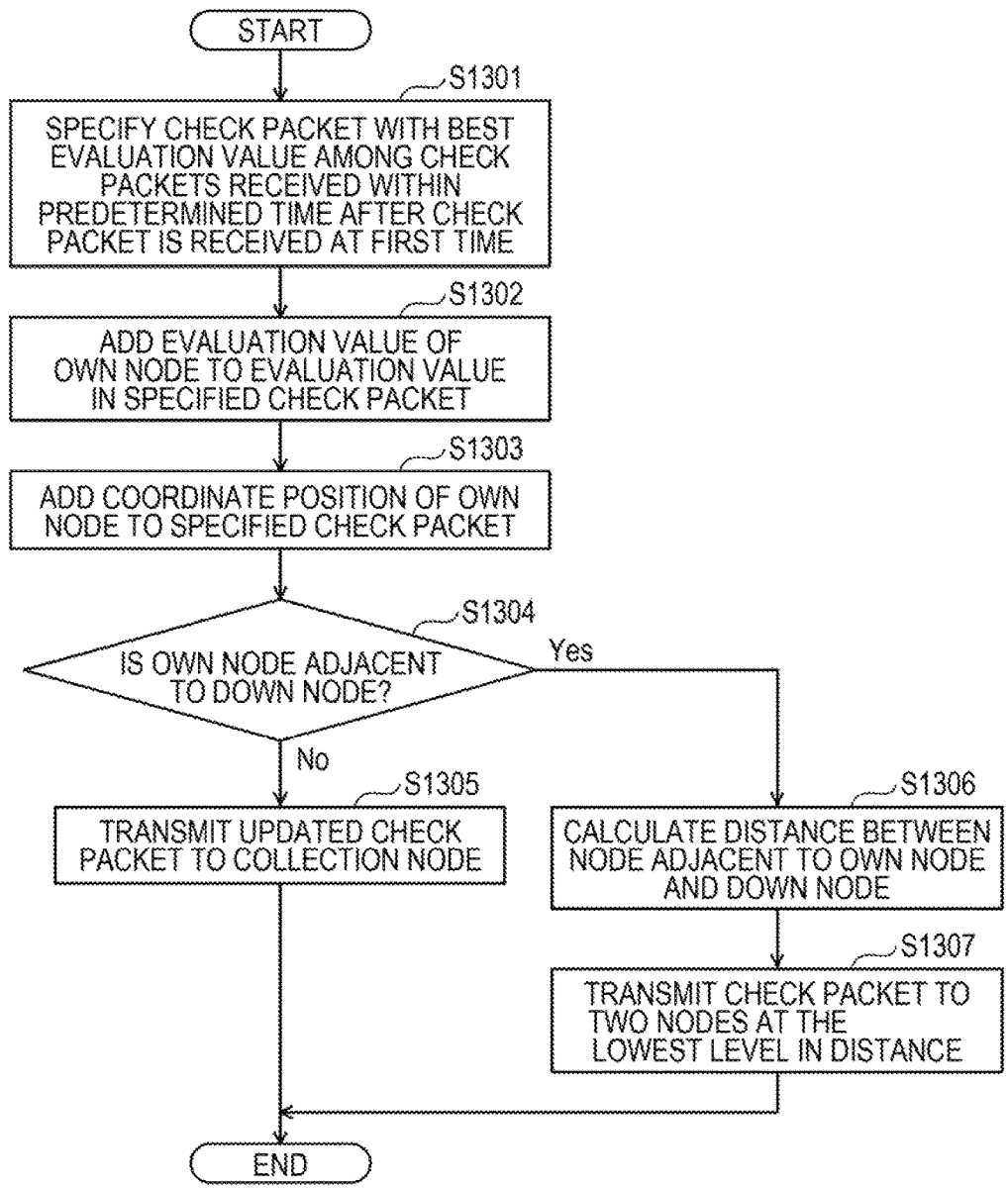
FIG. 13 is a diagram illustrating an example of an operational flowchart for a processing procedure of a node in which a check packet is received, according to an embodiment.

FIG. 13 is an operational flowchart illustrating an example of a processing procedure of a node that has received a check packet. The node having received the check packet specifies a check packet having the best evaluation value among the check packets received within a predetermined time after the check packet is received at first time (step S1301). The node having received a check packet discards the check packets received after the predetermined time has elapsed.

Next, the node having received the check packet adds the evaluation value of the own node to the evaluation value in the specified check packet (step S1302). In addition, the node having received the check packet adds the coordinate position of the own node to the specified check packet (step S1303).

Next, the node having received the check packet determines whether or not the own node is adjacent to the down node P (step S1304). In a case where the node is adjacent to the down node P (Yes in step S1304), since the node having received the check packet is an adjacent node ad, the node transmits the updated check packet to the collection node An (step S1305). Here, a transmission route through which the check packet is transmitted to the collection node An is not particularly limited, and may be any route.

A node, which has received a check packet transmitted to the collection node An, does not perform the processing illustrated in FIG. 13 so that the check packet is not transmitted again in the direction approaching the down node. For example, the adjacent node adds the coordinate position of the own node in the route information item in the check packet, and further adds the coordinate position of the down node P in the route information item. When the destination node coordinate item in the received check packet matches the node coordinate item at the last of the route information item, the node that has received the check packet determines that the received check packet is a check packet approaching the collection node An. Alternatively, for example, the adjacent node may update the destination node type item or the content of the destination node coordinate item in the check packet approaching the collection node An. In addition, the adjacent node may add an item, indicating that the check packet approaches the collection node An, in the check packet approaching the collection node An.

On the other hand, in a case where the node is not adjacent to the down node P (No in step S1304), the node having received the check packet calculates a distance between a next-hop node adjacent to the own node and the down node P (step S1306). The node having received the check packet transmits the check packet to two nodes at the lowest level in the distance (step S1307). Here, the transmission of the check packet to the two nodes at the lowest level in the distance is an example and is not limited thereto. For example, the node having received the check packet transmits the check packet, to a next-hop node in the direction approaching the down node P, among the plurality of nodes.

Specifically, in a case where a node having received the check packet and the down node P are not on the same plane, the node having received the check packet transmits the check packet, to each node in three directions approaching the down node P. In a case where a node having received the check packet and the down node P are on the same plane but not on the same straight line, the node having received the check packet transmits the check packet, to each node in two directions approaching the down node P. In a case where the node having received the check packet and the down node P are on the same straight line, the node having received the check packet transmits the check packet, to the node in one direction approaching the down node P.

After the processing of step S1305 or step S1307 is terminated, the node having received the check packet terminates the processing thereof.

Next, an operation example of the collection node An having received a check packet will be described with reference to FIGS. 14 and 15.

FIG. 14 is an explanatory diagram (part 1) illustrating an operation example of the collection node An that has received a check packet. The node having received the check packet specifies the check packet having the best evaluation value among the check packets received within a predetermined time after the check packet is received at first time.

In FIG. 14, the specification by the collection node An is illustrated. The table 1401 illustrated in FIG. 14 is a table in which a specification item by the collection node is added to the table 1101 illustrated in FIG. 11. The records 1401-1 to 1401-3 included in the table 1401 correspond to the records 1101-1 to 1101-3, respectively. The collection node An receives a check packet indicating the route rt1 and a check packet indicating the route rt3. Here, as illustrated by the record 1401-1, the evaluation value of the check packet indicating the route rt1 is 2.2, and as illustrated by the record 1401-3, the evaluation value of the check packet indicating the route rt3 is 3. Therefore, the collection node An specifies the check packet indicating the route rt1 having the best evaluation value.

Next, the collection node An instructs each node on the determined route to perform RDMA transmission. A specific example of the RDMA transmission will be described with reference to FIG. 15.

FIG. 15 is an explanatory diagram (part 2) illustrating an operation example of the collection node An that has received a check packet. The RDMA controller 304 of the node R1 that has received the instruction of the RDMA transmission transmits the data stored in the memory 302 of the node R2 that is a transmission source, to the memory 302 of the node R1 that is a transmission destination, by using the RDMA transmission. The shaded portion in the memory 302 of the node R2 in FIG. 15 is an area in which the down information as a collection object is stored, and the shaded portion in the memory 302 of the node R1 in FIG. 15 is an area for storing the down information.

For example, in the example of FIG. 14, first, the adjacent node ad1 becomes the node R1, and the down node P becomes the node R2. Thus, the RDMA controller 304 of the adjacent node ad1 performs the RDMA transmission. Next, the node nd1 becomes the node R1, and the adjacent node ad1 becomes the node R2. Thus, the RDMA controller 304 of the node nd1 performs the RDMA transmission. In addition, the collection node An becomes the node R1, and the node nd1 becomes the node R2. Thus, the RDMA controller 304 of the collection node An performs the RDMA transmission.

The collection node An that has acquired the down information investigates a cause of occurrence of the problem or the like by using the down information, and converts the down information into an output format. The collection node An determines a transmission route between the collection node An and the storage node In, by substantially the same method as the flowchart illustrated in FIG. 13. Specifically, as the processing different from the flowchart of FIG. 13, the node having received the check packet performs "determination of whether or not the own node is the storage node In", instead of "determination of whether or not the own node is adjacent to the down node P" in the processing of step S1304. In addition, the node having received the check packet performs "calculation of a distance between the node adjacent to the own node and the storage node In", instead of "calculation of a distance between the node adjacent to the own node and the down node P" in the processing of step S1306.

Next, the collection node An instructs each node on the determined route to perform the RDMA transmission, and transmits the data that is converted to the output format, to the storage node In. Next, a flowchart illustrating information collection processing that is performed by the collection node An will be described with reference to FIG. 16.

FIG. 16 is an operational flowchart illustrating an example of procedures of information collection processing. The collection node An receives, from the management node md, an instruction for collecting data in the memory 302 of the down node P and storing the data, which is obtained by converting the collected data to the output format, in the storage node In (step S1601). Next, the collection node An transmits a check packet in the direction approaching the down node P (step S1602). The collection node An determines the route indicated by the check packet having the best evaluation value among the check packets received within a predetermined time after the check packet is received at first time, as a transmission route between the down node P and the collection node An (step S1603). Next, the collection node An instructs each node on the determined route to perform the RDMA transmission of the down information (step S1604). Upon acquiring the down information by the RDMA transmission, the collection node An converts the down information to the output format (step S1605).

Next, the collection node An transmits a check packet in the direction approaching the storage node (step S1606). The collection node An determines the route indicated by the received check packet, as a transmission route between the collection node and the storage node (step S1607). Next, the collection node An instructs each node on the determined route to perform the RDMA transmission of the down information that has been converted to the output format (step S1608). Here, the collection node An may perform the processing of step S1606 and the processing of step S1602 at the same time. When the processing of step S1606 and the processing of step S1602 are performed at the same time, the collection node An performs the processing of step S1603 and the processing of step S1607 simultaneously in parallel. For example, the collection node An may perform the processing of step S1603 or the processing of step S1607, according to the destination node type item in the received check packet.

After the processing of step S1608 is terminated, the collection node An terminates the information collection processing. The storage node In stores the down information that has been converted to the output format in the disk thereof.

As described above, the parallel processing apparatus 101 sequentially relays the check packet to which the evaluation value of each node is added, from the collection node An with low power consumption to the down node P and the storage node In, and determines a transmission route based on the evaluation value in the check packet relayed in each direction. Thus, in the information collection processing, the parallel processing apparatus 101 is able to suppress the influence on the job that is being executed by the entire of the parallel processing apparatus 101. In addition, in the embodiment, the collection node An acquires the check packet for specifying a transmission route through which the check packet reaches the adjacent node ad or the storage node In, from the adjacent node ad or the storage node In. Thus, the collection node An is able to specify a transmission route without searching the combinations of routes based on the coordinate positions of the respective nodes. Therefore, in the information collection processing according to the embodiment, it is possible to suppress the load applied to the collection node An in the information collection processing, and to suppress the influence on the job that is being executed in the collection node An or in a node adjacent to the collection node An.

In addition, the parallel processing apparatus 101 may determine the storage node In from the IO nodes, based on the power consumption of each node of the IO nodes and/or the memory usage of each node of the IO nodes. Accordingly, in the information collection processing, the parallel processing apparatus 101 is able to store the dump information in the IO node with less influence on the job.

In addition, upon receiving a check packet, a node that is neither the adjacent node ad nor the storage node In may transmit the check packet including the evaluation value obtained by adding the evaluation value of the own node to the evaluation value of another node included in the received check packet. Accordingly, it is unnecessary for the collection node An to perform the addition processing, and thus the node that is neither the adjacent node ad nor the storage node In is able to suppress the load applied to the collection node An in the information collection processing.

In addition, upon receiving a check packet, the adjacent node ad and the storage node In may transmit the check packet including the evaluation value obtained by adding the evaluation value of the own node to the evaluation value of another node included in the received check packet. Accordingly, it is unnecessary for the collection node An to perform the addition processing, and thus the adjacent node ad and the storage node In is able to suppress the load applied to the collection node An in the information collection processing.

It is assumed that a node that is neither the adjacent node ad nor the storage node In receives a plurality of check packets. In this case, the node that is neither the adjacent node ad nor the storage node In may specify one check packet based on the evaluation values included in the plurality of check packets, and transmit the check packet obtained by adding the evaluation value of the own node to the specified check packet. Accordingly, transmission route candidates to be determined by the collection node An may be narrowed, and thus the node that is neither the adjacent node ad nor the storage node In is able to suppress the load applied to the collection node An in the information collection processing.

It is assumed that the adjacent node ad and the storage node In receive a plurality of check packets. In this case, the adjacent node ad and the storage node In may specify one check packet based on the evaluation values included in the plurality of check packets, and transmit the check packet obtained by adding the evaluation value of the own node to the evaluation value of another node in the specified check packet. Accordingly, transmission route candidates to be determined by the collection node An may be narrowed, and thus the adjacent node ad and the storage node In is able to suppress the load applied to the collection node An in the information collection processing.

The collection node An performs the information collection processing by using the determined route. Accordingly, the collection node An is able to collect and convert the down information, and store the converted down information in the storage node In, while suppressing the influence on the job that is being executed in each node.

The node information collection method described in the embodiment may be implemented by causing a computer such as a personal computer, a workstation, or the like to execute a prepared program. The node information collection program is recorded in computer-readable recording medium such as a hard disk, a flexible disk, a compact disc-read only memory (CD-ROM), a digital versatile disk (DVD), or the like, and executed by reading from the recording medium by the computer. The node information collection program may be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A parallel processing apparatus comprising:
a plurality of nodes each including a memory and a processor configured to relay data between the plurality of nodes, wherein
the processor of a management node that is included in the plurality of nodes and manages the plurality of nodes, is configured to:
when a failure occurs in a first node of the plurality of nodes, determine a collection node that is included in the plurality of nodes and collects first information stored in the memory of the first node, based on power consumption and/or memory usage of each of the plurality of nodes, and
transmit, to the determined collection node, data including a first instruction for causing a storage node in the plurality of nodes to store second information generated from the first information into the memory of the storage node;
the processor of the collection node is configured to, upon receiving the first instruction, transmit data including a second instruction that Instructs transmission of an evaluation value for communication performance of each node, in a first direction approaching the first node and in a second direction approaching the storage node, respectively;
the processor of a second node that is included in the plurality of nodes and is neither an adjacent node adjacent to the first node nor the storage node, is configured to:
upon receiving data that is transmitted in the first direction and includes the second instruction, transmit data obtained by adding an evaluation value for communication performance of the second node to the received data, in the first direction, and
upon receiving data that is transmitted in the second direction and includes the second instruction, transmit data obtained by adding an evaluation value for communication performance of the second node to the received data, in the second direction;
the processor of each of the adjacent node and the storage node is configured to, upon receiving data that is transmitted in the first direction or in the second direction and includes the second instruction, transmit data including an evaluation value for communication performance of another node that is included in the received data and an evaluation value for communication performance of the each of the adjacent node and the storage node, to the collection node; and
the processor of the collection node is configured to:
upon receiving data including an evaluation for communication performance of the adjacent node, determine a transmission route between the collection node and the first node, based on the received data, and
upon receiving data including an evaluation value for communication performance of the storage node, determine a transmission route between the collection node and the storage node, based on the received data.

2. The parallel processing apparatus of claim 1, wherein the plurality of nodes includes two or more nodes each including a non-volatile storage device;
the processor of the management node is configured to:
when a failure occurs in the first node, determine the storage node from among the two or more nodes, based on power consumption and/or memory usage of each of the two or more nodes, and
transmit data including the first instruction to the collection node; and
the processor of the collection node is configured to, upon receiving the first instruction, transmit data including the second instruction in the first direction and the second direction, respectively.

3. The parallel processing apparatus of claim 1, wherein the processor of the second node is configured to:
upon receiving data that is transmitted in the first direction and includes the second instruction, transmit, in the first direction, data including an evaluation value obtained by adding an evaluation value for communication performance of the second node to an evaluation value for communication performance of another node included in the received data, and
upon receiving data that is transmitted in the second direction and includes the second instruction, transmit, in the second direction, data including an evaluation value obtained by adding an evaluation value for communication performance of the second node to an evaluation value for communication performance of another node included in the received data.

4. The parallel processing apparatus of claim 1, wherein the processor of each of the adjacent node and the storage node is configured to:
upon receiving data that is transmitted in the first direction or in the second direction and includes the second instruction, transmit data including an evaluation value obtained by adding an evaluation value for communication performance of the each of the adjacent node and the storage node and an evaluation value for communication performance of another node included in the received data, to the collection node.

5. The parallel processing apparatus of claim 1, wherein the second node is configured to:
upon receiving plural pieces of data that are transmitted in the first direction and include the second instruction, specify a piece of data among the plural pieces of data, based on an evaluation value for communication performance of another node included in each of the plural pieces of data, and transmit, in the first direction, data obtained by adding an evaluation value for communication performance of the second node to the specified piece of data, and upon receiving plural pieces of data that are transmitted in the second direction and include the second instruction, specify a piece of data among the plural pieces of data, based on an evaluation value for communication performance of another node included in each of the plural pieces of data, and transmit, in the second direction, data obtained by adding an evaluation value for communication performance of the second node to the specified piece of data.

6. The parallel processing apparatus of claim 1, wherein the processor of each of the adjacent node and the storage node is configured to:
  upon receiving plural pieces of data that are transmitted in the first direction or the second direction and include the second instruction, specify a piece of data among the plural pieces of data, based on an evaluation value for communication performance of another node included in each of the plural pieces of data, and
  transmit data including an evaluation value for communication performance of another node included in the specified piece of data and an evaluation value for communication performance of the each of the adjacent node and the storage node, to the collection node.

7. The parallel processing apparatus of claim 1, wherein the processor of the collection node is configured to:
  transmit a third instruction for relaying information stored in the memory of the first node, to each node on the determined transmission route between the collection node and the first node, and
  transmit a fourth instruction for converting information obtained by the third instruction, relaying the converted information, and storing the converted information in the memory of the storage node, to each node on the determined transmission route between the collection node and the storage node.

8. The parallel processing apparatus of claim 1, wherein the processor of the collection node is configured to:
  transmit, in the first direction, data including the second instruction and first identification information identifying the first direction, and
  transmit, in the second direction, data including the second instruction and second identification information identifying the second direction;
the processor of the second node is configured to:
  upon receiving data including the first identification information, transmit data obtained by adding an evaluation value for communication performance of the second node to the received data, in the first direction, and
  upon receiving data including the second identification information, transmit data obtained by adding an evaluation value for communication performance of the second node to the received data, in the second direction;
the processor of each of the adjacent node and the storage node is configured to, upon receiving data including the first identification information or the second identification information, transmit data obtained by adding an evaluation value for communication performance of the each of the adjacent node and the storage node to the received data, to the collection node; and
the processor of the collection node is configured to:
  upon receiving data including the first identification information, determine a transmission route between the collection node and the first node, based on the received data, and
  upon receiving data including the second identification information, determine a transmission route between the collection node and the storage node, based on the received data.

9. A method performed by a parallel processing apparatus including a plurality of nodes each including a memory and a processor configured to relay data between the plurality of nodes, the method comprising:
  causing a management node among the plurality of nodes, which manages the plurality of nodes, to:
    when a failure occurs in a first node of the plurality of nodes, determine a collection node that is included in the plurality of nodes and collects first information stored in the memory of the first node, based on power consumption and/or memory usage of each of the plurality of nodes, and
    transmit, to the determined collection node, data including a first instruction for causing a storage node in the plurality of nodes to store second information generated from the first information into the memory of the storage node;
  causing the collection node to, upon receiving the first instruction, transmit data including a second instruction that instructs transmission of an evaluation value for communication performance of each node, in a first direction approaching the first node and in a second direction approaching the storage node, respectively;
  causing a second node that is included in the plurality of nodes and is neither an adjacent node adjacent to the first node nor the storage node, to:
    upon receiving data that is transmitted in the first direction and includes the second instruction, transmit data obtained by adding an evaluation value for communication performance of the second node to the received data, in the first direction, and
    upon receiving data that is transmitted in the second direction and includes the second instruction, transmit data obtained by adding an evaluation value for communication performance of the second node to the received data, in the second direction;
  causing each of the adjacent node and the storage node to, upon receiving data that is transmitted in the first direction or in the second direction and includes the second instruction, transmit data including an evaluation value for communication performance of another node that is included in the received data and an evaluation value for communication performance of the each of the adjacent node and the storage node, to the collection node; and
  causing the collection node to:
    upon receiving data Including an evaluation for communication performance of the adjacent node, determine a transmission route between the collection node and the first node, based on the received data, and
    upon receiving data including an evaluation value for communication performance of the storage node, determine a transmission route between the collection node and the storage node, based on the received data.

10. A non-transitory, computer-readable recording medium having stored therein a program for causing a computer included in a parallel processing apparatus that includes a plurality of nodes each including a memory and a processor configured to relay data between the plurality of nodes, to execute a process comprising:
- causing a management node among the plurality of nodes, which manages the plurality of nodes, to:
  - when a failure occurs in a first node of the plurality of nodes, determine a collection node that is included in the plurality of nodes and collects first information stored in the memory of the first node, based on power consumption and/or memory usage of each of the plurality of nodes, and
  - transmit, to the determined collection node, data including a first instruction for causing a storage node in the plurality of nodes to store second information generated from the first information into the memory of the storage node;
- causing the collection node to, upon receiving the first instruction, transmit data including a second instruction that instructs transmission of an evaluation value for communication performance of each node, in a first direction approaching the first node and in a second direction approaching the storage node, respectively;
- causing a second node that is included in the plurality of nodes and is neither an adjacent node adjacent to the first node nor the storage node, to:
  - upon receiving data that is transmitted in the first direction and includes the second instruction, transmit data obtained by adding an evaluation value for communication performance of the second node to the received data, in the first direction, and
  - upon receiving data that is transmitted in the second direction and includes the second instruction, transmit data obtained by adding an evaluation value for communication performance of the second node to the received data, in the second direction;
- causing each of the adjacent node and the storage node to, upon receiving data that is transmitted in the first direction or in the second direction and includes the second instruction, transmit data including an evaluation value for communication performance of another node that is included in the received data and an evaluation value for communication performance of the each of the adjacent node and the storage node, to the collection node; and
- causing the collection node to:
  - upon receiving data including an evaluation for communication performance of the adjacent node, determine a transmission route between the collection node and the first node, based on the received data, and
  - upon receiving data including an evaluation value for communication performance of the storage node, determine a transmission route between the collection node and the storage node, based on the received data.

* * * * *